United States Patent
Lanciault et al.

(10) Patent No.: US 6,522,332 B1
(45) Date of Patent: Feb. 18, 2003

(54) GENERATING ACTION DATA FOR THE ANIMATION OF CHARACTERS

(75) Inventors: Robert Lanciault, Quebec (CA); Andre Gauthier, Quebec (CA)

(73) Assignee: Kaydara, Inc., Montreal (CA)

( * ) Notice: Subject to any disclaimer, the term of this patent is extended or adjusted under 35 U.S.C. 154(b) by 266 days.

(21) Appl. No.: 09/626,155

(22) Filed: Jul. 26, 2000

(51) Int. Cl.[7] .............................................. G06T 17/00
(52) U.S. Cl. ..................................................... 345/473
(58) Field of Search ............................... 345/473, 474, 345/475

(56) References Cited

U.S. PATENT DOCUMENTS

| | | | |
|---|---|---|---|
| 5,990,908 A | | 11/1999 | Thingvold |
| 6,191,798 B1 | * | 2/2001 | Handelman et al. ......... 345/473 |
| 6,278,455 B1 | * | 8/2001 | Baker .......................... 345/349 |
| 6,317,132 B1 | * | 11/2001 | Perlin .......................... 345/474 |
| 6,400,368 B1 | * | 6/2002 | Laperriere ................... 345/473 |

OTHER PUBLICATIONS

Welman, "Inverse Kinematics and Geometric Constraints for Articulated Figure Manipulation", Simon Fraser University, Sep. 1993.

Boulic et al, "Hierarchical Kinematic Behaviors for Complex Articulated Figures" in "Interactive Computer Animation" Prentice Hall Europe 1996.

Boulic et al, "Position Control of the Center of Mass for Articulated Figures in Multiple Support", Proc. 6th Eurographics Workshop on Animation and Simulation, pp. 130–143, Sep. 1995.

Boulic et al, "Robust Position Control of the Center of Mass with Second Order Inverse Kinetics", Interactive Computer Animation, Copyright 1997.

Phillips et al, "Interactive Behaviors for Bipedal Articulated Figures", Computer Graphics, vol. 25, No. 4, Jul. 1991.

Boulic et al, "An Anatomic Human Body for Motion Capture", Computer Graphics Laboratory, Switzerland, Copyright 1999.

Bindiganavale, "Generating Motions from Motion Capture Data", Test through Studio for Creative Enquiry, Carnegie Mellon UniversityUniversity of Pennsylvania Internal Report, 1995.

(List continued on next page.)

*Primary Examiner*—Cliff N. Vo
(74) *Attorney, Agent, or Firm*—Nixon & Vanderhye P.C.

(57) ABSTRACT

Action data for the animation of characters is generated in a computer animation system. Body part positions for a selected character are positioned in response to body part positions captured from performance data. The positions and orientations of body parts are identified for a generic actor in response to a performance in combination with a biomechanical model. As a separate stage of processing, positions and orientations of body parts for a character are identified in response to the position and orientation of body parts for the generic actor in combination with a biomechanical model. Registration data for the performance associates body parts of the performance and body parts of the generic actor. Similar registration data for the character associates body parts in the generic actor with body parts of the character. In this way, using the generic actor model, it is possible to combine any performance data that has been registered to the generic actor with any character definitions that have been associated to a similar generic actor.

21 Claims, 24 Drawing Sheets

OTHER PUBLICATIONS

Gleicher, "Retargetting Motion to New Characters", PREPRINT Apr. 27, 1998—to appear at SIGGRAPH '98.

Badler et al, "Real–Time Control of a Virtual Human Using Minimal Sensors", Real–Time Control of a Virtual Human Using Minimal Sensors, Presence, 2(1), pp 82–86, 1993.

Boulic et al, "Combined Direct and Inverse Kinematic Control for Articulated Figure Motion Editing", Computer Graphics Forum, vol. 2, No. 4, Oct. 1992.

Zhao et al, "Inverse Kinematics Positioning Using Nonlinear Programming for Highly Articulated Figures", ACM Transactions on Graphics, vol. 13, No. 4, Oct. 1994, pp. 313–336.

Gleicher et al, "Constraint–Based Motion Adaptation", Advanced Technology Group, Jun. 14, 1996.

Rose, "Efficient Generation of Motion Transitions Using Spacetime Constraints", Adobe PDF Document, Copyright 1999.

Bodenheimer et al, "The Process of Motion Capture: Dealing with the Data", Presented at Eurographics Case '97, Computer Animation and Simulation '97, Budapest, Hungary, Sep. 2–3, 1997.

Molet et al, "A Real Time Anatomical Converter For Human Motion Capture", Computer Graphics Laboratory (LIG), Swis Federal Institute of Technology (EPFL), Switzerland, Published Sep. 1996.

Thalmann, "Human Modelling and Animation", Eurographics '93 State–of–the–Art Reports, Chapter 7, 1993.

* cited by examiner

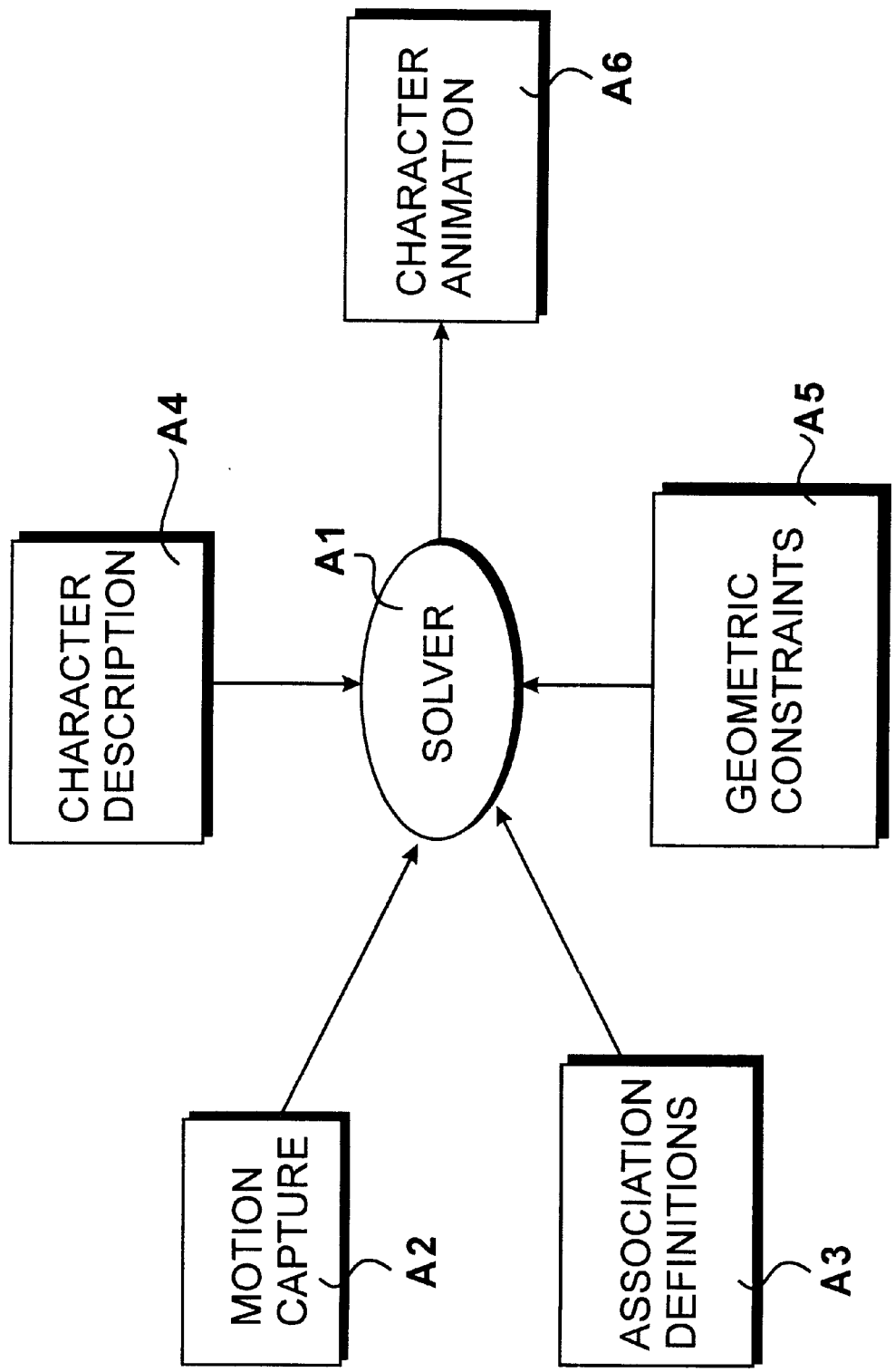
*Figure A*
PRIOR ART

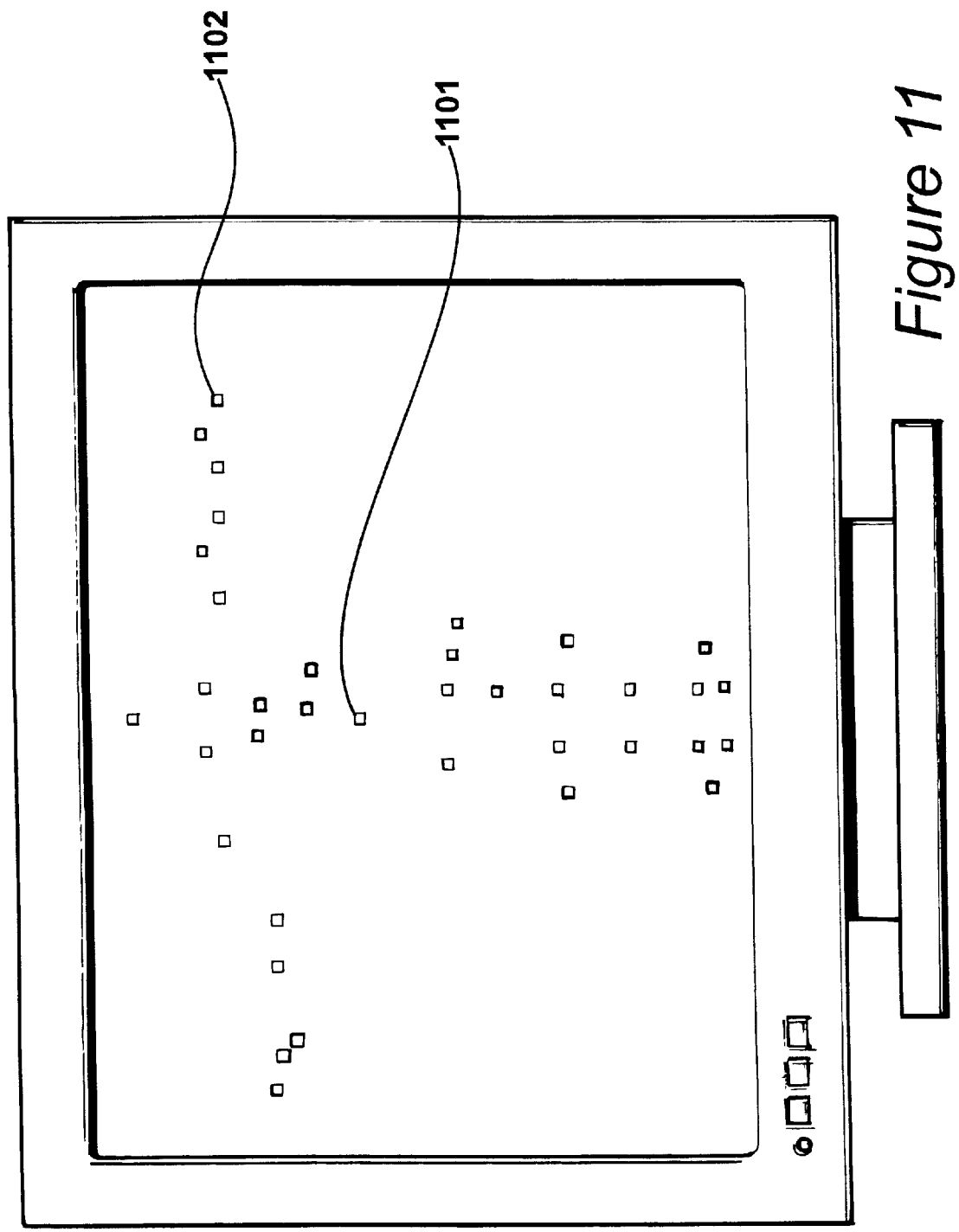

| MARKER | BODY PART | POSITION OFFSET | | | ORIENTATION OFFSET | | |
|---|---|---|---|---|---|---|---|
| | | X | Y | Z | X | Y | Z |
| #1 | HIPS | 0010 | 0201 | 0223 | 020 | 023 | 001 |
| #2 | LEFTKNEE | 1210 | 0100 | 0251 | 037 | 192 | 010 |
| #3 | LEFTANKLE | 1217 | 0050 | 0237 | 219 | 327 | 015 |
| #4 | RIGHTKNEE | 1310 | 0101 | 0240 | 037 | 150 | 012 |
| #5 | RIGHTANKLE | 1312 | 0053 | 0231 | 254 | 290 | 154 |
| #6 | CHEST | 1253 | 0250 | 0212 | 090 | 018 | 027 |
| " | " | " | " | " | " | " | " |
| " | " | " | " | " | " | " | " |
| " | " | " | " | " | " | " | " |

*Figure 14*

| GENERIC ACTOR | CHARACTER |
|---|---|
| BASE | |
| ─HIPS | SAMURAIHIPS |
| ─LEFTUPLEG | SAMURAILEFTUPLEG |
| ─LEFTLEG | SAMURAILEFTLEG |
| ─LEFTFOOT | SANURAILEFTFOOT |
| ─RIGHTUPLEG | SAMURAIRIGHTUPLEG |
| ─RIGHTLEG | SAMURAIRIGHTLEG |
| ─RIGHTFOOT | SAMURAIRIGHTFOOT |
| ─SPINE | SAMURAISPINE |
| ─LEFTARM | SAMURAILEFTARM |
| ─LEFTFOREARM | SAMURAILEFTFOREARM |
| ─LEFTHAND | SAMURAILEFTHAND |
| " | " |
| " | " |
| " | " |

1701 — GENERIC ACTOR
1702 — CHARACTER

*Figure 17*

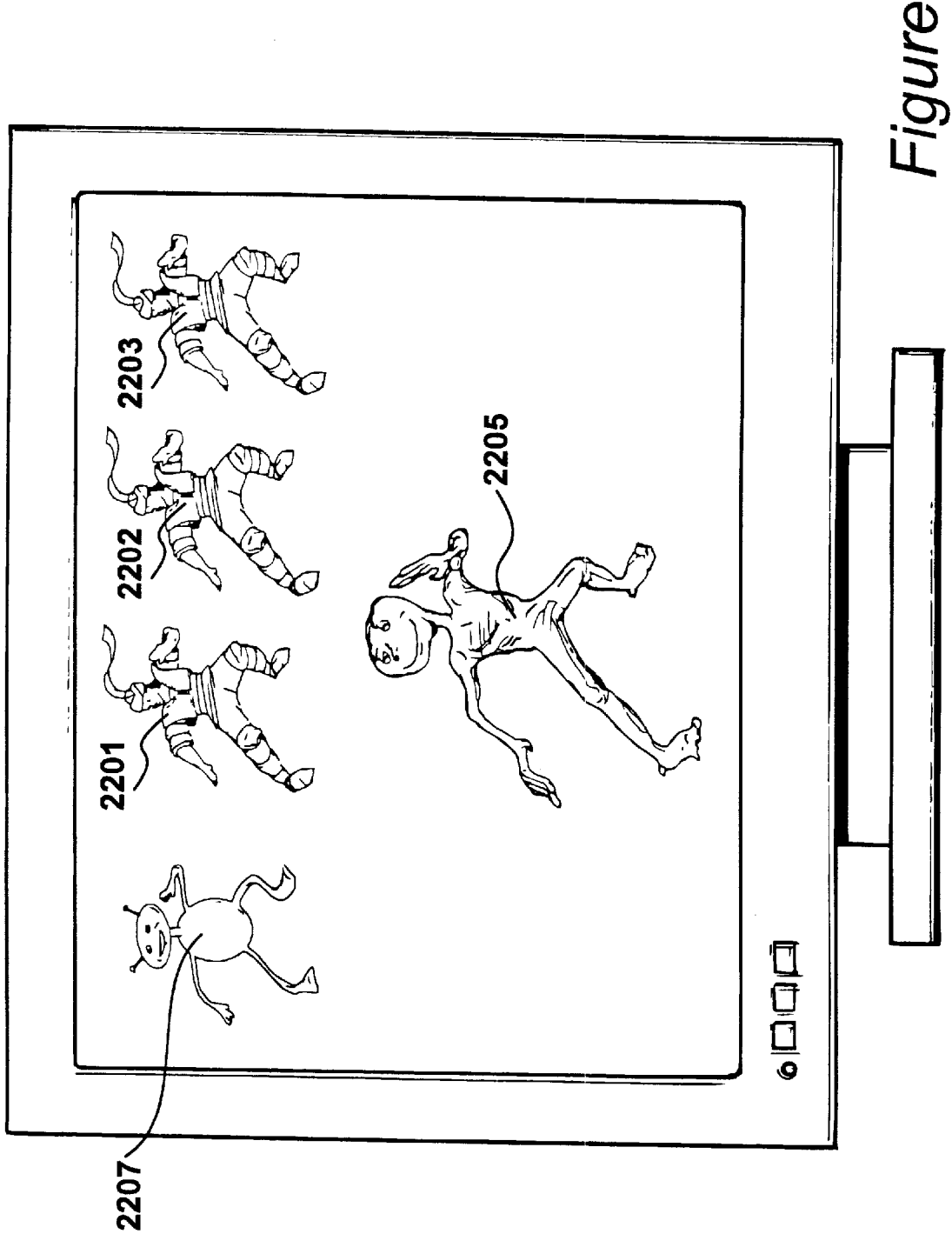

GENERATING ACTION DATA FOR THE ANIMATION OF CHARACTERS

BACKGROUND OF THE INVENTION

1. Field of the Invention

The present invention relates to the generation of action data for animating a character such that body part locations for a selected character are positioned in response to body part locations captured from performance data. The invention relates to apparatus in a computer animation system, a method for animating a character and a computer carrying medium.

2. Description of the Related Art

In the field of three-dimensional graphics, motion is generally considered to be a successive configuration of geometric three dimensional objects over time. The movement is achieved by a succession of frames wherein the position of the three-dimensional objects are defined within each of these frames. When object positions are generated on a frame by frame basis at a rate equal to the frame display rate, the animation is considered to be displayed in real time. In this way, computer generated animations may be used as an alternative to traditional artistic solutions and the resulting product may also be included with real action captured by camera for use in cinematographic, video or computer-based presentations.

An example of a known procedure for animating a character in response to captured performance data is illustrated in FIG. A. The system shown in FIG. A makes use of a process referred to as a solver, which uses processes of forward kinematics, inverse kinematics, three-point rotation and other techniques that may be generally referred to as a set of geometric constraints. The solver calculates the locations for one or more nodes in order to provide a best fit representation of segments connecting these nodes. These techniques generally require a significant degree of processing operations and may introduce additional inconsistencies into the motion data. As processing power has increased and become more generally available, it has become possible to deploy these techniques into a commercial animation environment.

A solver A1 receives captured motion A2 derived from sensors applied to a moving performer. These sensors may be considered as defining locations within the solver's model and as such it is necessary to associate each location A3 such that real sensors placed on the performer are individually associated with modelled body parts of the animated character. The character itself is described by means of a character description A4 and movements of the character are defined with reference to geometric constraints A5. Thus, in response to input data defining a character description A4, the captured motion A2, association definitions A3 and the geometric constraints it is possible to generate character animation A6.

Thus, it can be seen that for each character to be animated, it is necessary to go through a process of obtaining captured motion and then applying this, in combination with the character description, the associations and the geometric constraints, in order to produce character animation in which a specific character is animated in accordance with the captured motion data. In particular, for each animated performance, it is necessary to define the association definitions A3 which, in order to ensure accurate registration, is a relatively time consuming process. In some circumstances, it may be desirable for several characters of different sizes and shapes to perform similar motions. Given the necessity to establish good registration with the locations, this would usually involve performing the process repeatedly for each character animation. Thus, this situation may be summarised in that for each particular character animation to be produced, it is necessary to create a specific marker set which can then be used to ensure that the captured motion registers correctly with the character animation. Put another way, for each specific motion capture data A2 and for each specific character animation A6, it is necessary to define a specific association A3 so as to associate the two.

A problem that has been encountered recently is that, given the availability of affordable processing capabilities, the overriding overhead in terms of the production activity becomes that of actually establishing the association definitions which, ultimately, restricts the number of applications where these techniques may be employed.

BRIEF SUMMARY OF THE INVENTION

According to a first aspect of the present invention, there is provided apparatus for generating action data for animating a character such that body part locations for a selected character are positioned in response to body part locations captured from performance data. When implemented in a computer system, the system includes storage means configured to store program instructions for processing means, performance data, registration data for the performance and registration data for the character. In response to the stored instructions, the processing means is configurable by the program instructions to perform several processing steps. These steps comprise identifying the location of body parts of a generic actor in response to the performance in combination with a bio-mechanical model. Thereafter, locations of body parts are identified for a character in response to the position and orientation of body parts of the generic actor in combination with a bio-mechanical model. The registration data for the performance associates body parts in the performance data and body parts in the generic actor. The registration data for the character associates body parts in the generic actor with body parts in the character.

An advantage of the invention is that any performances registered to the generic actor may be combined with any character registered to the same generic actor. The re-usability of performance data and character definitions is thereby significantly increased.

The invention provides for the use of only two sets of geometric constraints that are used for any marker configuration or any character, given that these may be represented by the same bio-mechanical model. The human bio-mechanical model itself implicitly defines most of the set of the geometric constraints. The first set of geometric constraints is used to extract the human motion and the other is used to apply human motion. The marker set is used by the extracting solver so as to calculate an appropriate marker configuration. The solver defines the relationships between body parts in terms of mathematical expressions. Consequently, appropriate marker configurations are defined by the solver in terms of a specific parameterisation for the solver. The characterisation is used by the mapping solver to calculate a geometric configuration of the character. The registration data for the performance associates markers in the performance and body parts in the generic actor.

BRIEF DESCRIPTION OF THE DRAWINGS

FIG. A illustrates a known approach to animating a character in response to captured data;

FIG. 11 shows markers captured from an initiating "T" stance;

FIG. 14 shows an example of performance to generic actor registration data;

FIG. 17 illustrates how data defining body parts for the generic actor are associated with similar body parts of the character;

FIG. 22 shows an example of an output frame from an animation procedure.

DETAILED DESCRIPTION OF EXEMPLARY EMBODIMENTS

Figure 1:
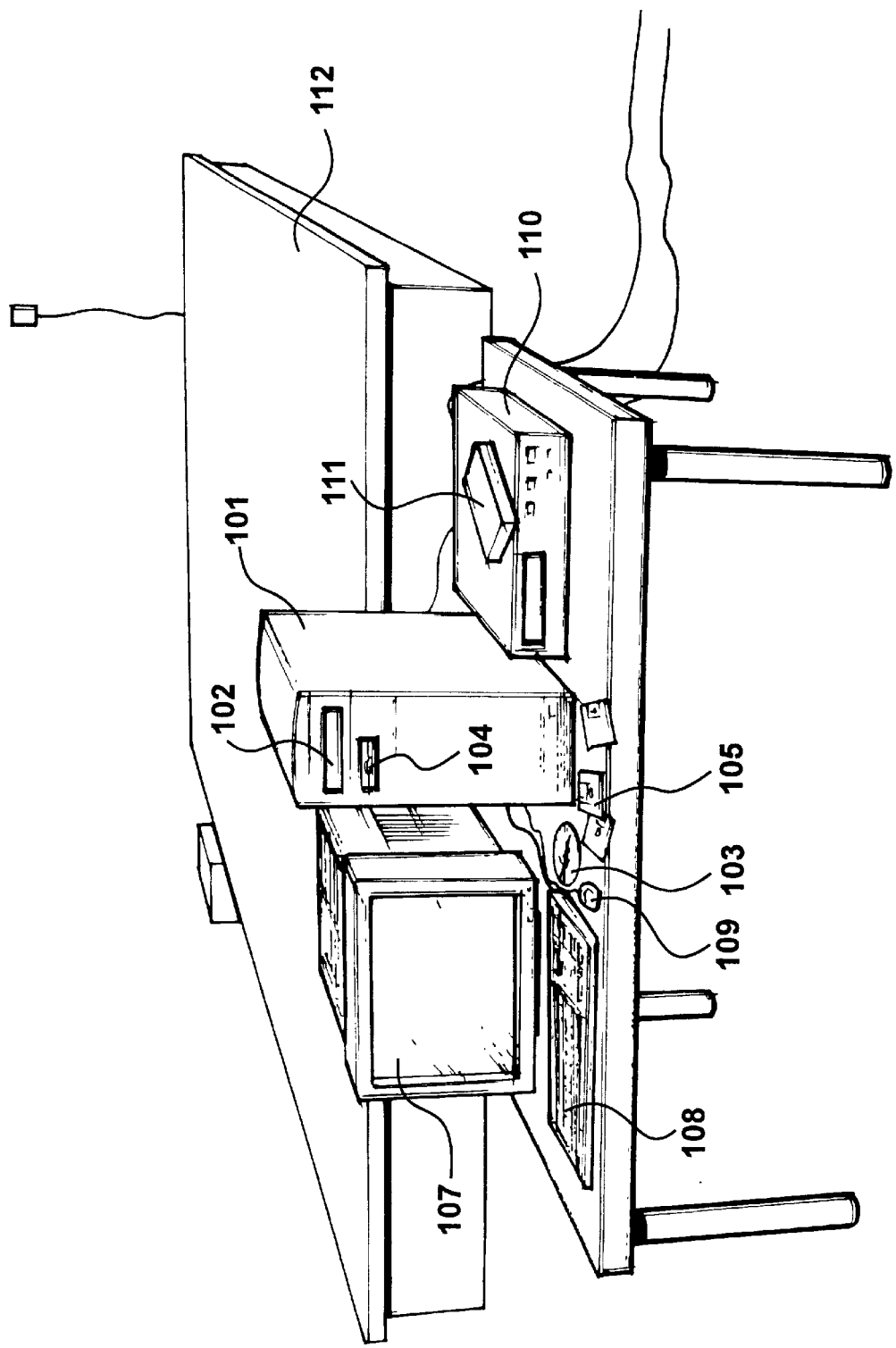
FIG. 1 shows a computer animation system for animating a character.

A computer animation system is illustrated in FIG. 1, that is arranged to generate action data for animating a character such that body part positions for a selected character are positioned in response to body part positions captured from performance data. The performance data is generated by detecting real movement made by a performer having appropriate detectors attached to body positions. The resulting animated character has a similar body topology to that of the performer but its size, proportion and, in particular, its appearance may be significantly different. The animated character may form part of an animated cartoon etc or, in more sophisticated environments, it may be incorporated within a motion picture including real video or cinematographic film recordings and then combined as part of a compositing process.

The system shown in FIG. 1 includes a programmable computer 101 having a drive 102 for receiving CD-ROMs 103 and a drive 104 for receiving magnetic disks 105, such as zip disks. Computer 101 may receive program instructions via an appropriate CD-ROM 103 and captured data may be received via a zip drive 105 or action data may be written to said drive.

Output data is displayed on a visual display unit 107 and manual input is received via a keyboard 108 and a mouse 109. Data may also be transmitted and received over a local area network. In addition to writing animation data in the form of action data to a disk 105, completed rendered animation frames may be supplied to a video tape recorder 110 such that animation data, in the form of video material, may be transferred to a compositive station or similar via a video tape 111. Performance data is captured by a performance being carded out on a stage 112. The stage 112 is preferably raised above floor level, in order to minimise any magnetic interference emanating from floor level cables.

Figure 2:
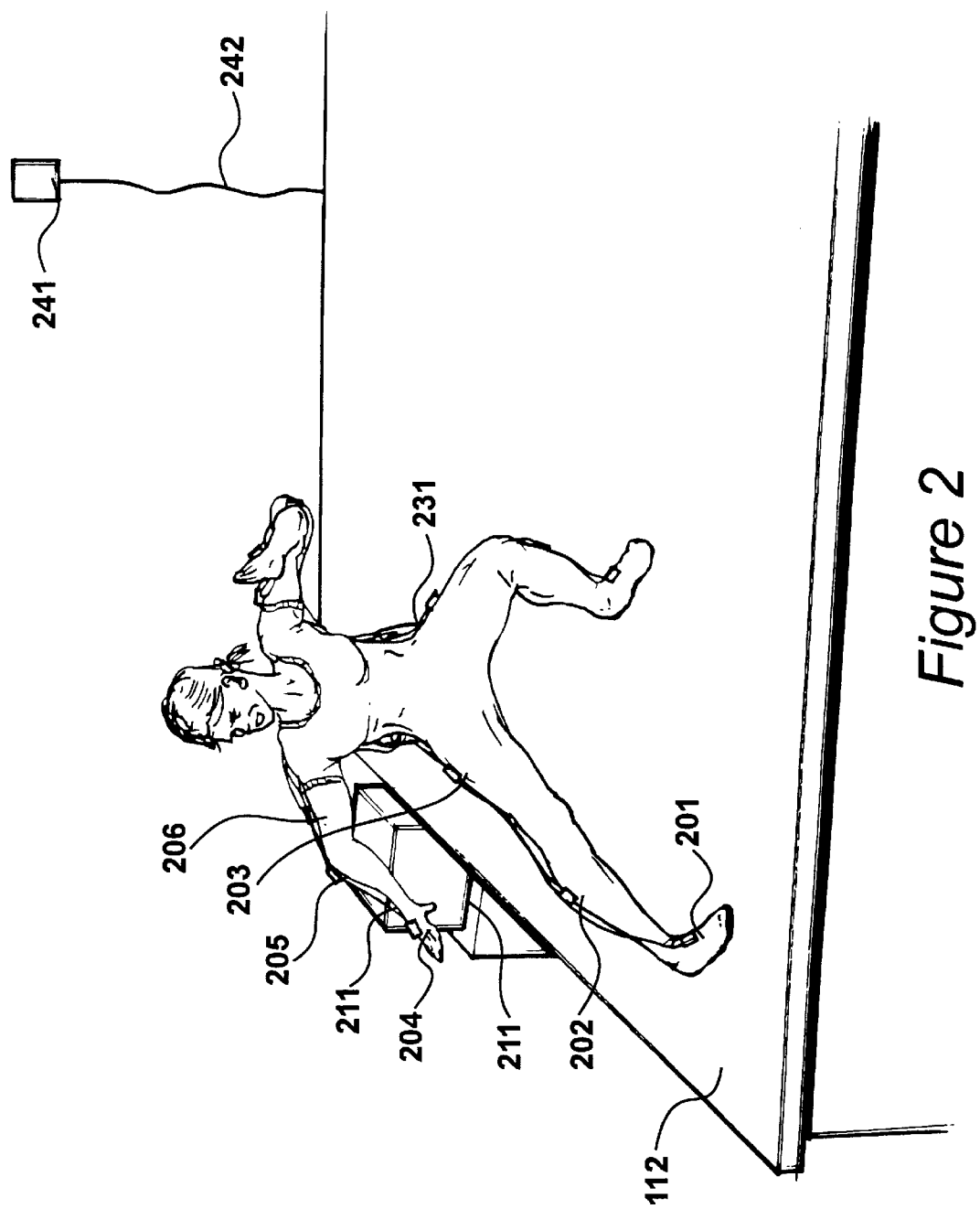
FIG. 2 shows a performer carrying out a performance in order to generate performance data.

A performer, as shown in FIG. 2, carries out a performance upon stage 112 in order to ensure that the motion of the performer can be captured with a high degree of accuracy. It is possible to apply potentiometers or similar mechanical devices to the performer's limbs in order to measure movements of these limbs. However, in the present preferred embodiment, performance motion is captured via optical sensors placed on the performer's body or by using magnetic sensors placed on the body. Magnetic sensors provide information describing positions and orientations, whereas optical sensors only provide information relating to position. Consequently, it is typical for in the region of 40 sensors to be used when employing optical techniques, whereas about 12 sensors are required when using magnetic techniques. In the example shown in FIG. 2, magnetic sensors 201, 202, 203, 204, 205, 206 etc have been attached to the performers body and positional and orientational data is derived from these sensors in response to the sensors being placed in an appropriate magnetic field, generated by an emitter 211. These measured positions and orientations are processed by a solver to determine body part locations.

In the presence of the magnetic field generated by emitter 211, each sensor 201 to 206 produces a signal transmitted along a respective wire 221 providing a representation of its position and orientation. Wires such as wire 221 are received at a transmitter unit 231 where the information is collected, encoded into a data stream and transmitted via a radio signal to a radio receiver 241. Radio receiver 241 conveys this positional information to computer 101 via a standard serial interface 242. In this way, computer system 101 receives a serial stream of data representing the position and orientation of the sensors at regular intervals of time. Detection systems of this type are available from Ascension Technology Corporation under the trademark MotionStar Wireless. Thus, this data generated in real time in response to motion of the performer is received at the computer 101 and represents performance data that may be manipulated in real time or written to a data file.

Figure 3:
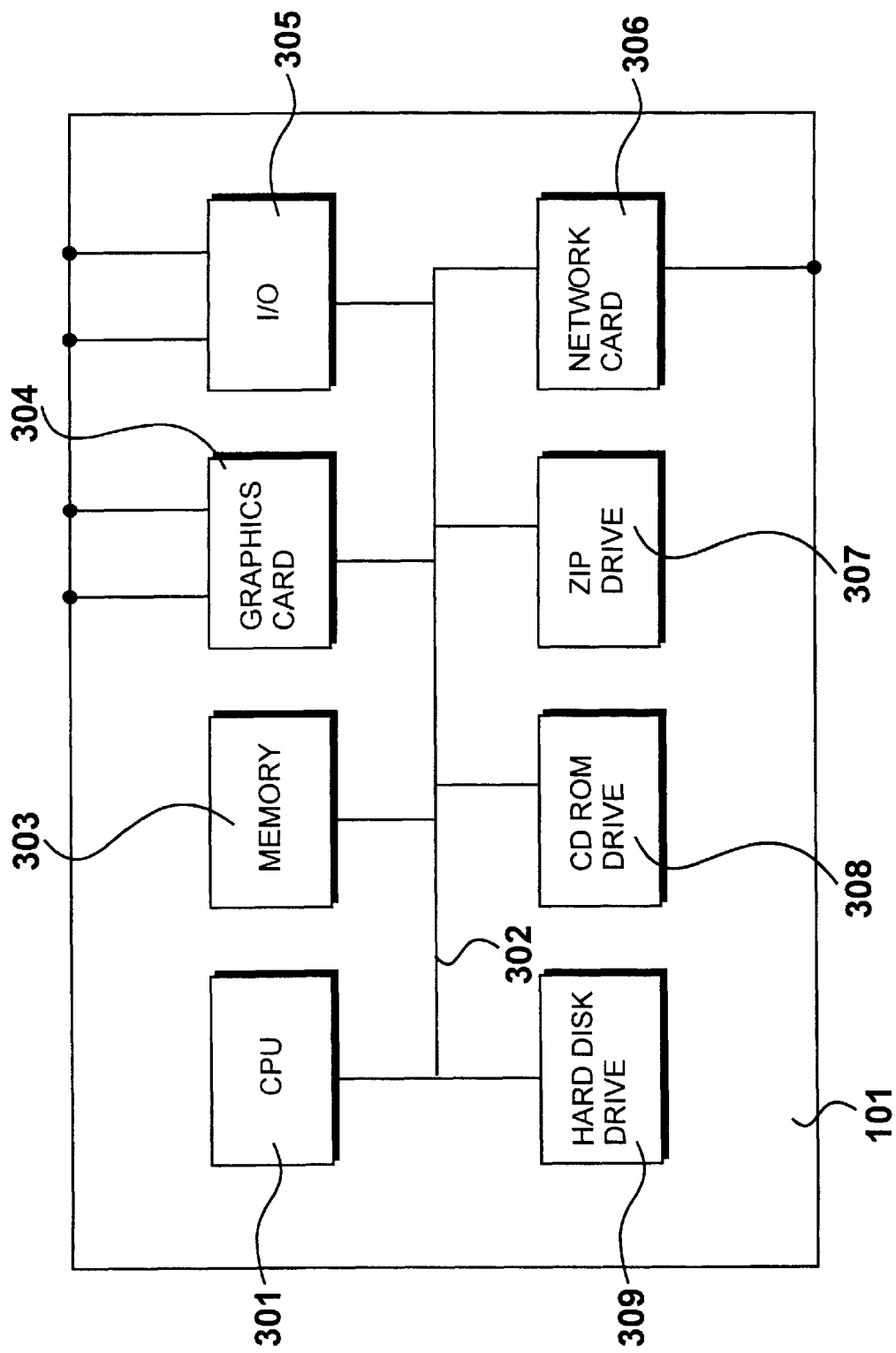
FIG. 3 details the computer system identified in FIG. 1.

Computer system 101 is illustrated in FIG. 3. The system includes a Pentium III™ central processing unit 301 operating under instructions received from random access memory 303 via a system bus 302. Memory 303 comprises 128 megabytes of randomly accessible memory and executable programs which, along with data, are received via said bus 302 from a hard disk drive 309. A graphics card 304 and input/output interface 305, a network card 306, a zip drive 307 and a CD-ROM drive 308 are also connected to bus 302. Graphics card 304 supplies graphical data to visual display unit 107 and the I/O device 305 receives performance data from transmitter 241, in addition to input commands from keyboard 108 and mouse 109. Zip drive 307 is primarily provided for the transfer of data, such as performance data, and CD-ROM drive 308 is primarily provided for the loading of new executable instructions to the hard disk drive 309.

Figure 4:
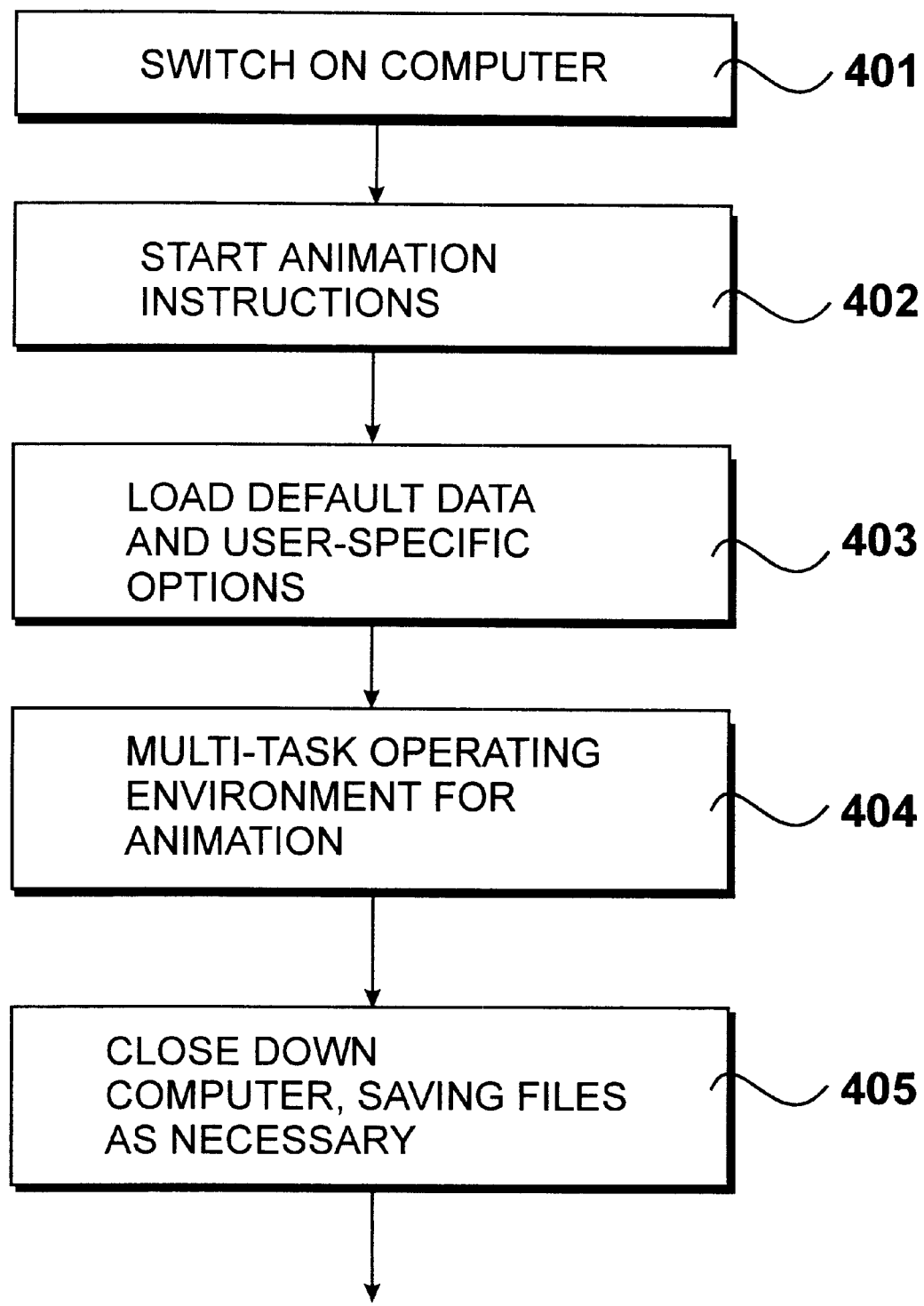
FIG. 4 identifies procedures for operating the computer animation system shown in FIG. 1.

Procedures for operating the computer animation system illustrated in FIG. 1 are identified in FIG. 4. After booting up the computer in step 401, animation instructions are started at step 402. At step 403 default data is loaded, along with user specific options. At step 404 a multi-tasking operating environment is presented to a user in order to effect the animation operations. After completing an animation session, the computer is closed down at step 405 with any useful files being saved to disk 309 as considered appropriate.

Figure 5:
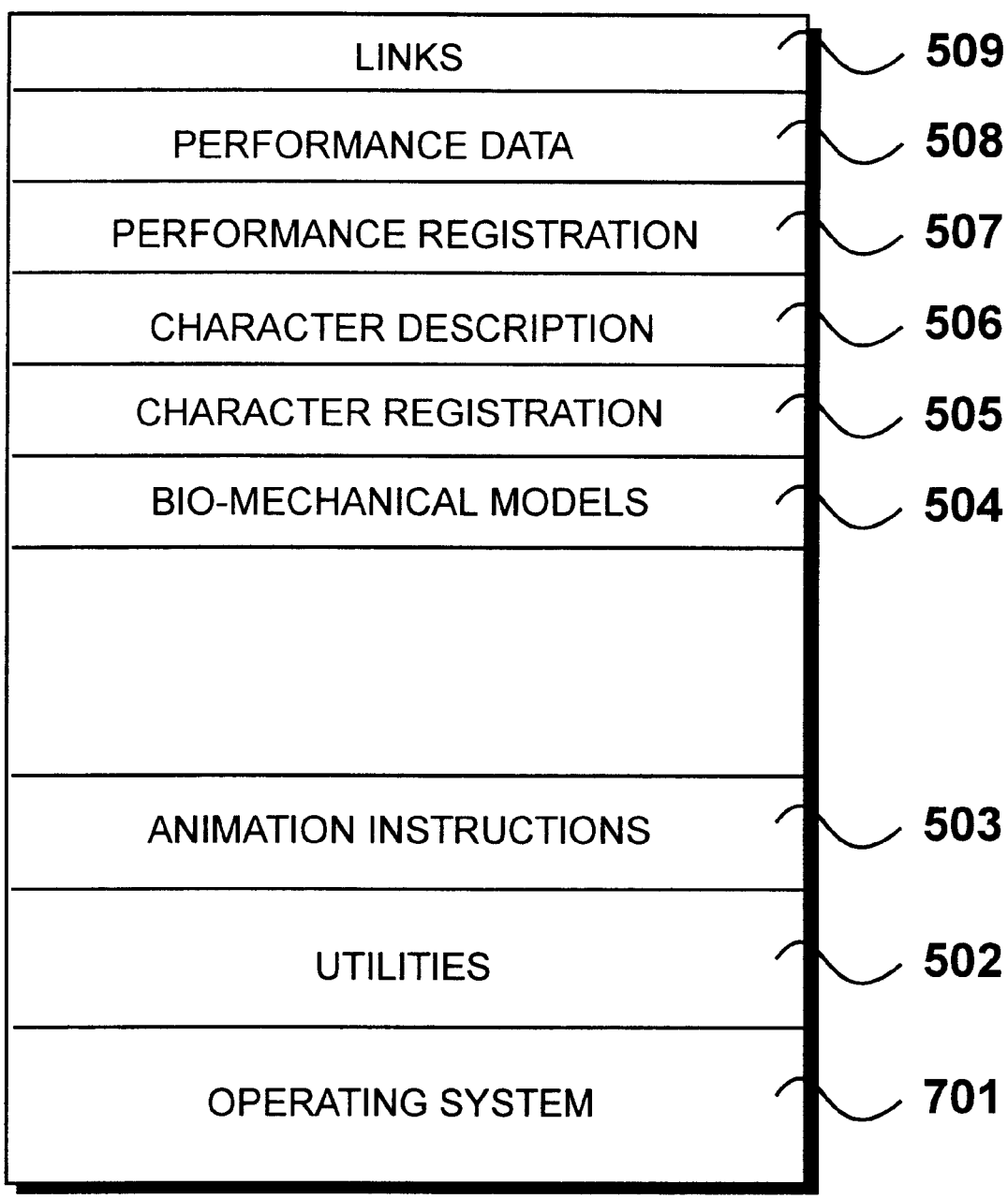
FIG. 5 shows a summary of contents stored in the memory of the computer system shown in FIG. 3.

A summary of contents stored in memory 303 for the purposes of effecting step 404 of FIG. 4, are illustrated in FIG. 5. Processor 301 operates in accordance with the Windows NT operating system 501 and this in turn may call upon a number of utilities 502 including device drivers such as drivers required for received transmissions from the transmitter 241. Instructions for generating the animation environment, originally loaded via CD-ROM 103, are stored at 503, effectively leaving the remainder of the memory space for operational data.

The operational data consists of bio-mechanical models 504, character registrations 505, character descriptions 506, performance registrations 507, performance data 508 and links 509.

Figure 6:
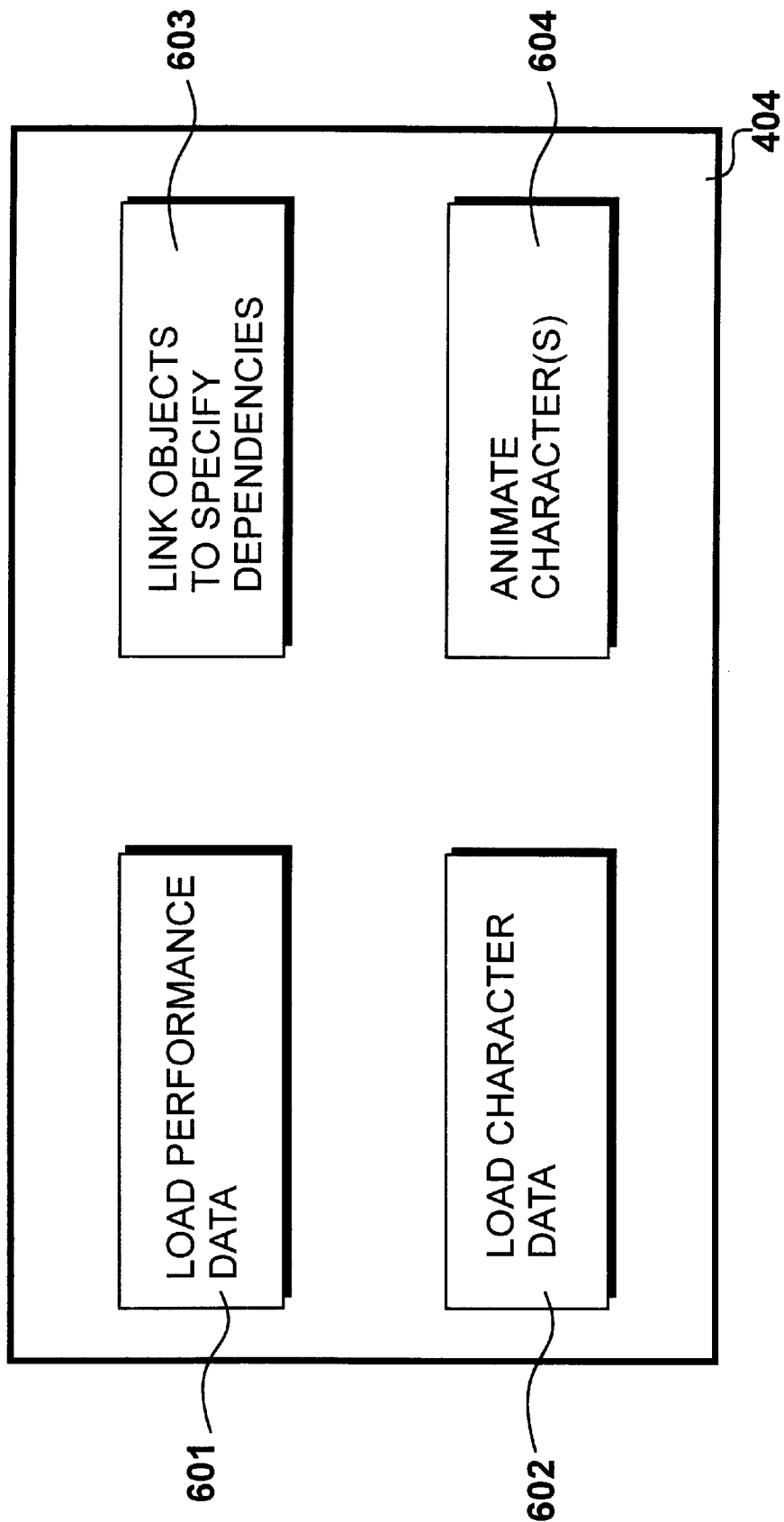
FIG. 6 shows a representation of the multitasking operating environment.

A representation summarising multitasking operating environment 404 is illustrated in FIG. 6. A graphical user interface is presented to a user, generated from the application instructions, from which selections may be made for particular tasks to be executed. These individual tasks may be summarised as the loading of performance data 601, the loading of character data 602, the linking of objects to specify dependencies 603 and the actual character animation process 604.

Figure 7:
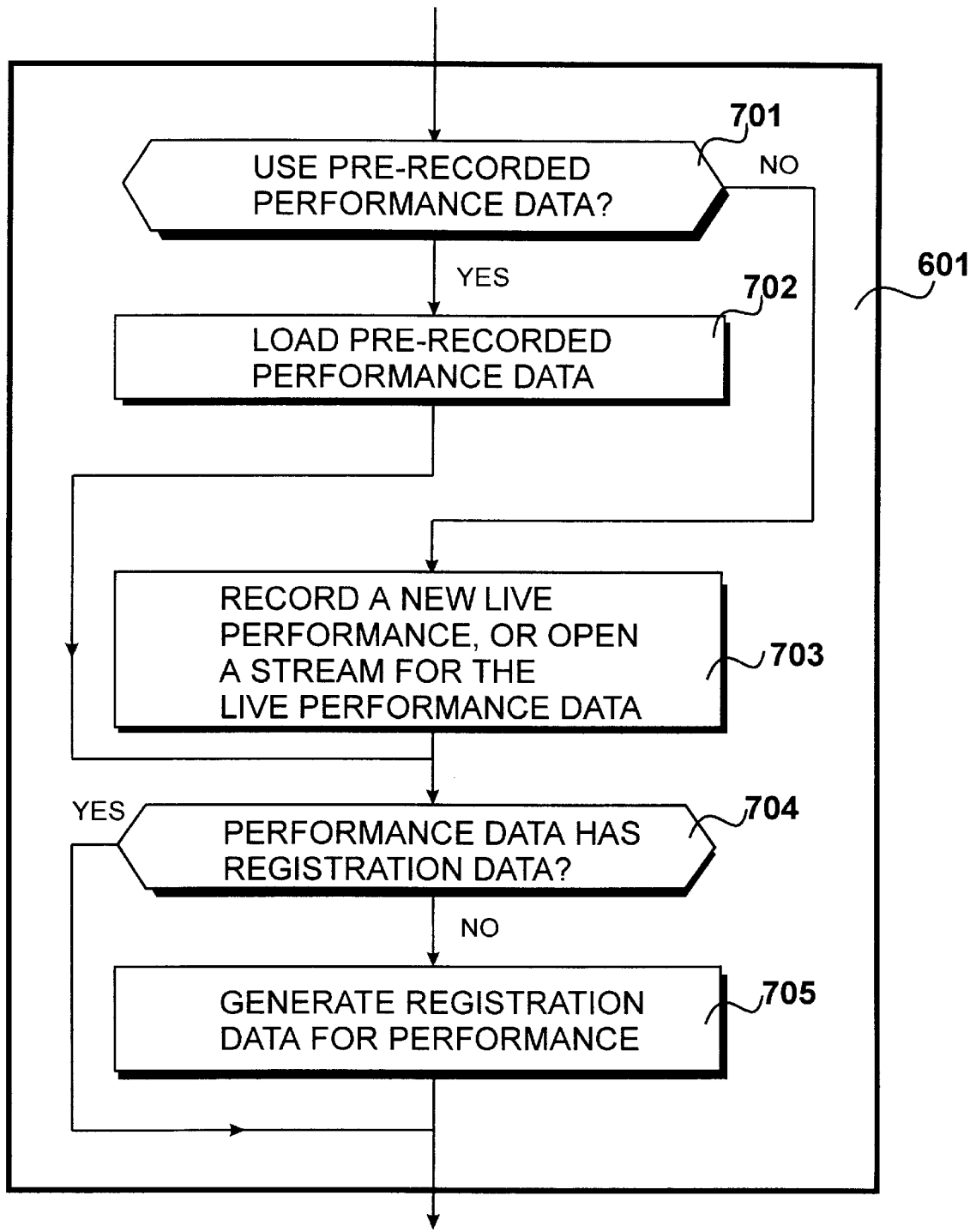
FIG. 7 shows the process for loading performance data identified in FIG. 6.

Process 601 for the loading of performance data is illustrated in FIG. 7. At step 701 a question is asked as to whether pre-recorded performance data is to be used and when answered in the negative, control is directed to step 703. If answered in the positive, pre-recorded performance data is loaded at step 702 and control is then directed to step 704. Alternatively, at step 703, new live performance data is recorded to a data file. Alternatively, the new live performance data may be streamed to a stream object and thereafter manipulated in real time.

At step 704 a question is asked as to whether the performance data has registration data and when answered in the negative, registration data is generated at step 705. The generation of registration data is manually intensive and the present invention seeks to minimise the number of occasions when the generation of new data is required. Thus, implementation of the invention within this environment should result in the question asked in step 704 being answered more times in the affirmative thereby significantly speeding up the overall rate of work flow.

Figure 8:
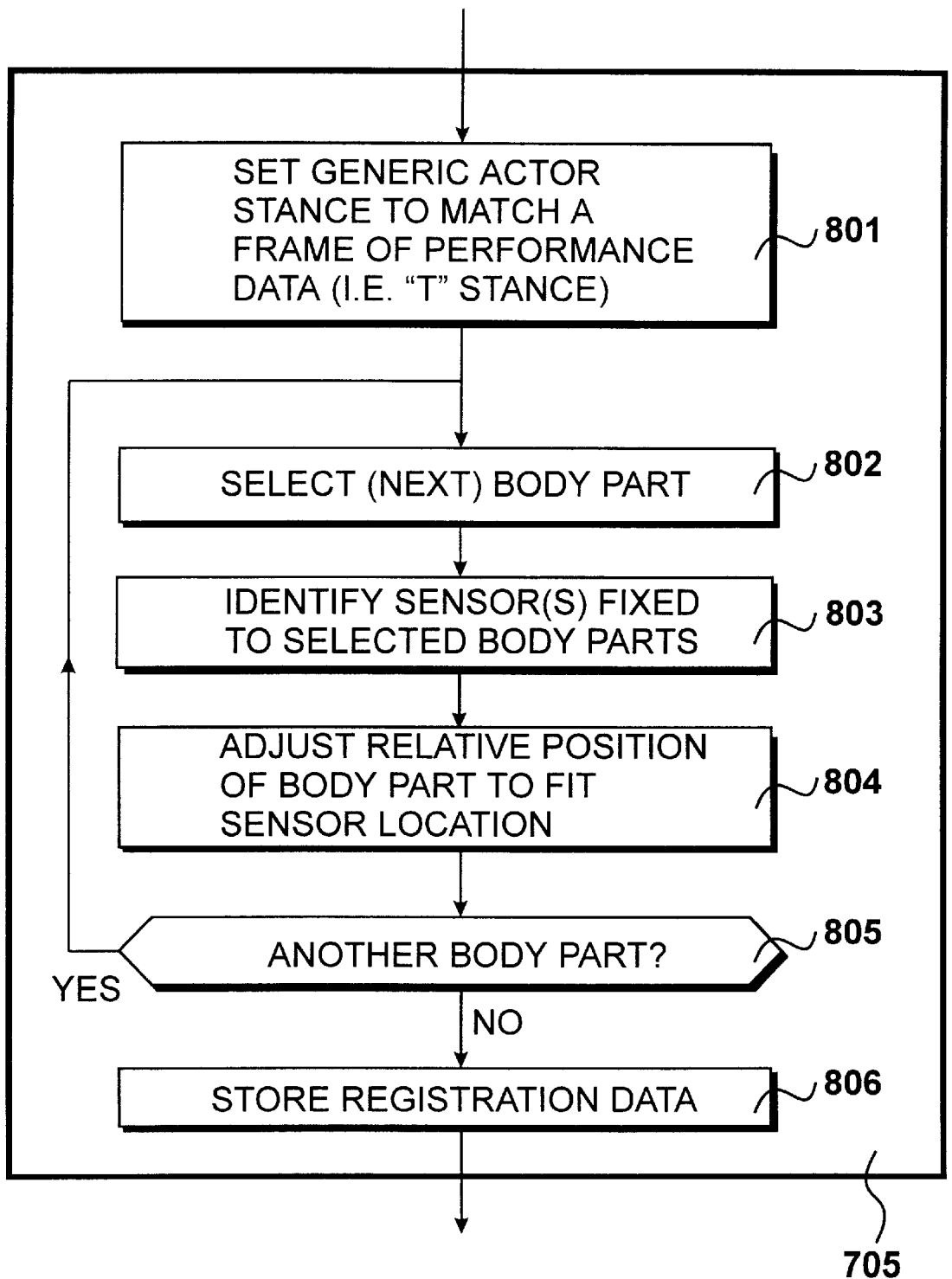
FIG. 8 shows the process for the generation of registration data identified in FIG. 7.

Process 705 for the generation of registration data is illustrated in FIG. 8. At step 801, a generic actor stance is set to match a frame of performance data. The actual stance chosen may vary provided that consistency is maintained. In the preferred embodiment, a "T" stance is adopted, in which the generic actor model is standing upright with feet together and arms extending substantially horizontally.

At step 802 a body part is selected on the generic actor model whereafter at step 803 a particular sensor or sensors are identified from the set of sensors attached to the performer that correspond to the body parts selected at 802. Thus, the effect of steps 802 and 803 is to provide a registration mapping between an actual body part of the performer and a representation of this body part within the generic actor model.

At step 804, further manual adjustment is made, in response to operations of mouse 109 while viewing an image on monitor 107, to ensure that the relative position of the body part fits the sensor location. Thereafter, when this fit has been made, a question is asked at step 805 as to whether another body part is to be considered and when answered in the affirmative control is returned to step 802. Eventually, all of the body parts will have been considered, resulting in the question asked at step 805 being answered in the negative, whereafter the registration data is stored at step 806.

It should be understood that it is the markers of the performance data that are associated to body parts of the generic model. Not all body parts of the generic model require a marker to be associated, given that valid movement will still be affected due to the definitions of the bio-mechanical model. It is also preferable for some body parts to have more than one marker associated thereto. In particular, it is preferable for the hips to have at least three markers associated thereto and it is also preferable for the chest to have at least two markers associated thereto.

When implementing a known approach such as that illustrated in FIG. A, it is necessary to perform the operations illustrated in FIG. 8 for every occurrence when a particular character is to be animated with respect to a particular performance data set. The present invention significantly reduces the number of times where the procedures illustrated in FIG. 8 need to be performed by adopting a procedure of the type shown in FIG. 9.

The operations of a geometric constraint solver were introduced with respect to FIG. A. The body is considered as a hierarchy of objects, such that there are parent objects and child objects extending therefrom. In the present example, it is preferable to establish a position of the hips and then extend outwards, body part by body part, with reference to constraints defined in the form of a bio-mechanical model.

In the present invention, the position and orientation of body parts of a generic actor are identified in response to performance data in combination with a bio-mechanical model. The position and orientation of body parts of a character are then identified in response to the position and orientation of body parts of the generic actor again in combination with a bio-mechanical model, preferably the same bio-mechanical model. The registration data for the performance associates markers of the performance data with body parts of the generic actor. Similarly, registration data for the character associates body parts in the generic actor with body parts in the character. Two processes of solving are performed but the generic actor solution enables any set of performance data to be associated with any character representation without requiring specific registration procedures to be performed for each specific instance of a particular performance data set to be associated with a particular character.

Associating markers of the performance data to body parts of the generic model can be a relatively time consuming exercise given that, on many occasions, the markers are displaced from an ideal body part location. For one reason, the bones of the performer are covered in flesh and sometimes clothing therefore it is not possible for the marker to be located at exactly the position of the bone or joint. Consequently, displacements must be calculated when performing associations of marker to body parts. The second stage registration procedure is different in that there is more of a one-to-one correlation between body parts of the generic actor and similar body parts of the character. Consequently, in order to effect a satisfactory association between the generic actor and a character, the following body parts of the generic actor should be associated to similar body parts of the character:

hips
left hip
left knee
left ankle
left foot
right hip
right knee
right ankle
right foot
chest
left shoulder
left elbow
left wrist
right shoulder
right elbow
right wrist
head A first solver 901 receives captured motion data 902, performance registration data 903 and is constrained by a bio-mechanical model 904. Thus, its operation is similar to that performed by solver A1 shown in FIG. A, except that it does not receive a character description and is not configured to produce an actual output character animation. In preference to producing a specific character animation, the first solver 901 produces a generic actor animation 905 that does not relate to any specific character but may be used as a generic starting point for rendering any specific character. Thus, the generic actor animation is effectively an intermediate data set although, if considered appropriate, it is possible to use this data set to describe a generic animated actor viewable on display unit 107.

The generic actor animation data set 905 is supplied to a second inverse kinematic solver 906, that in turn receives character description data 907, character registration data 908 and constraints defined by the bio-mechanical model 904 in order to produce a character animation 910. Thus, again, solver 906 is similar to solver Al, with the character registration data 908 being similar to the marker set data A3 and the bio-mechanical model 904 being similar to bio-mechanical model A5. However, instead of receiving motion data that has been registered specifically for the character, solver 906 receives the generic actor animation data 905.

Figure 9:
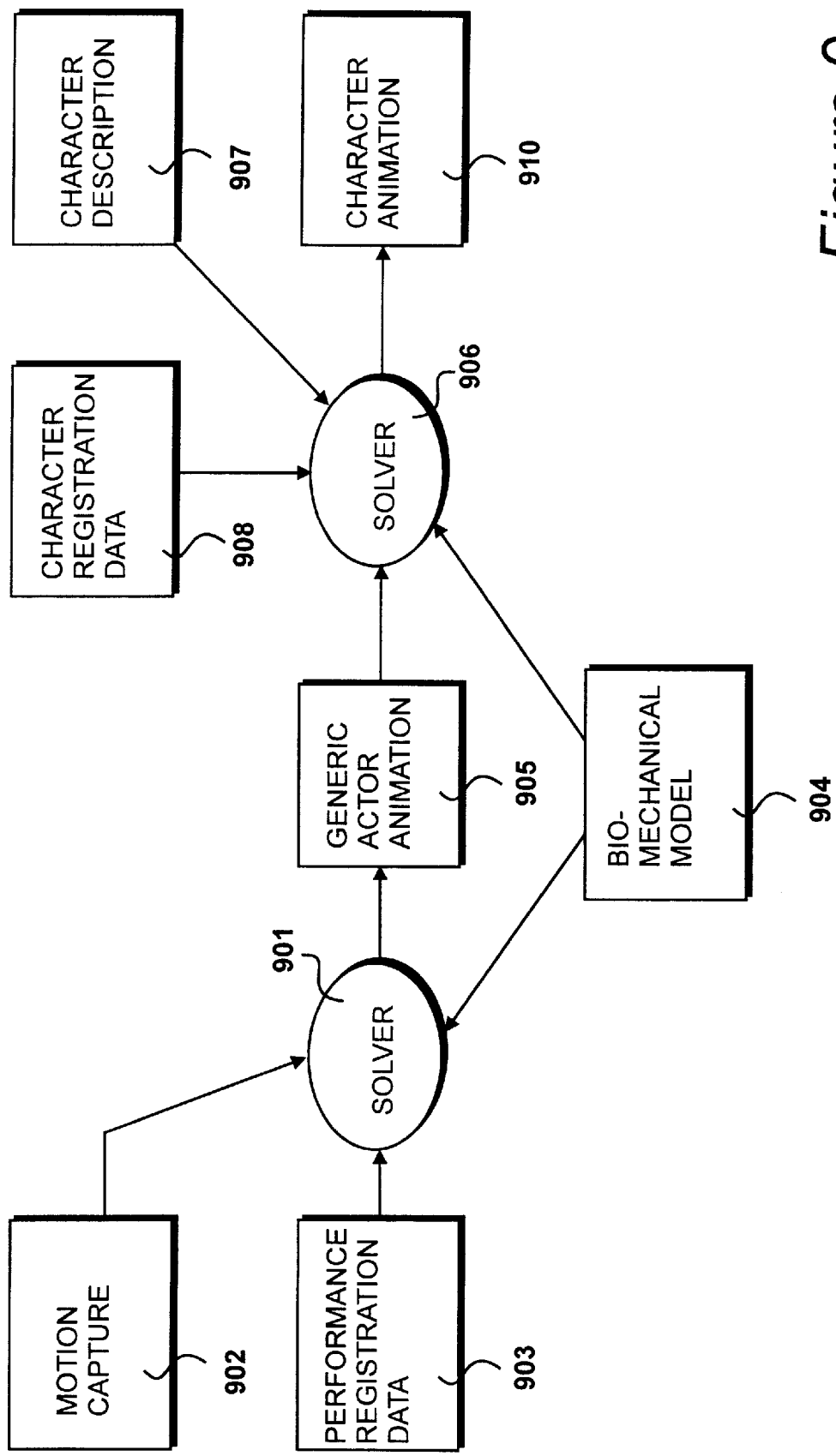
FIG. 9 summarizer operations performed by the preferred embodiment.

The process illustrated in FIG. 9 provides an environment in which the registration of motion data has been "decoupled" from the registration of character data. Thus, it is no longer necessary to perform a specific registration operation relating a specific motion capture to a specific character description. All motion capture is registered to the generic actor and similarly each individual character is registered to the same generic actor. In this way, any registered motion may be linked to any registered character data provided that the two have roughly similar topologies, such as a humanoid topology.

The advantage of this approach becomes most apparent when a significant number of motion data sets are to be linked to a significant number of character definitions. For a particular production, it is unlikely that all possible combinations would be required. However, the facilitated ease of linking between these two operations does allow substantially more experimentation to be performed that in turn allows animators to be more creative which will in turn result in an enhancement of production quality while at the same time providing an opportunity to reduce overall production activity. Furthermore, the approach also facilitates the re-use of data that has already been created for subsequent productions. It is possible for all of the captured motion data sets to be stored in a performance data library with a similar library being generated for character descriptions and registrations.

The generic actor animation data may be considered as an abstraction of the essential features that represent an animation, effectively placing the data in its own animation space. In this way, a real performance may be abstracted into the animation space whereafter this extracted data may be used to create a real animation from any appropriate character description and character registration data.

Figure 10:
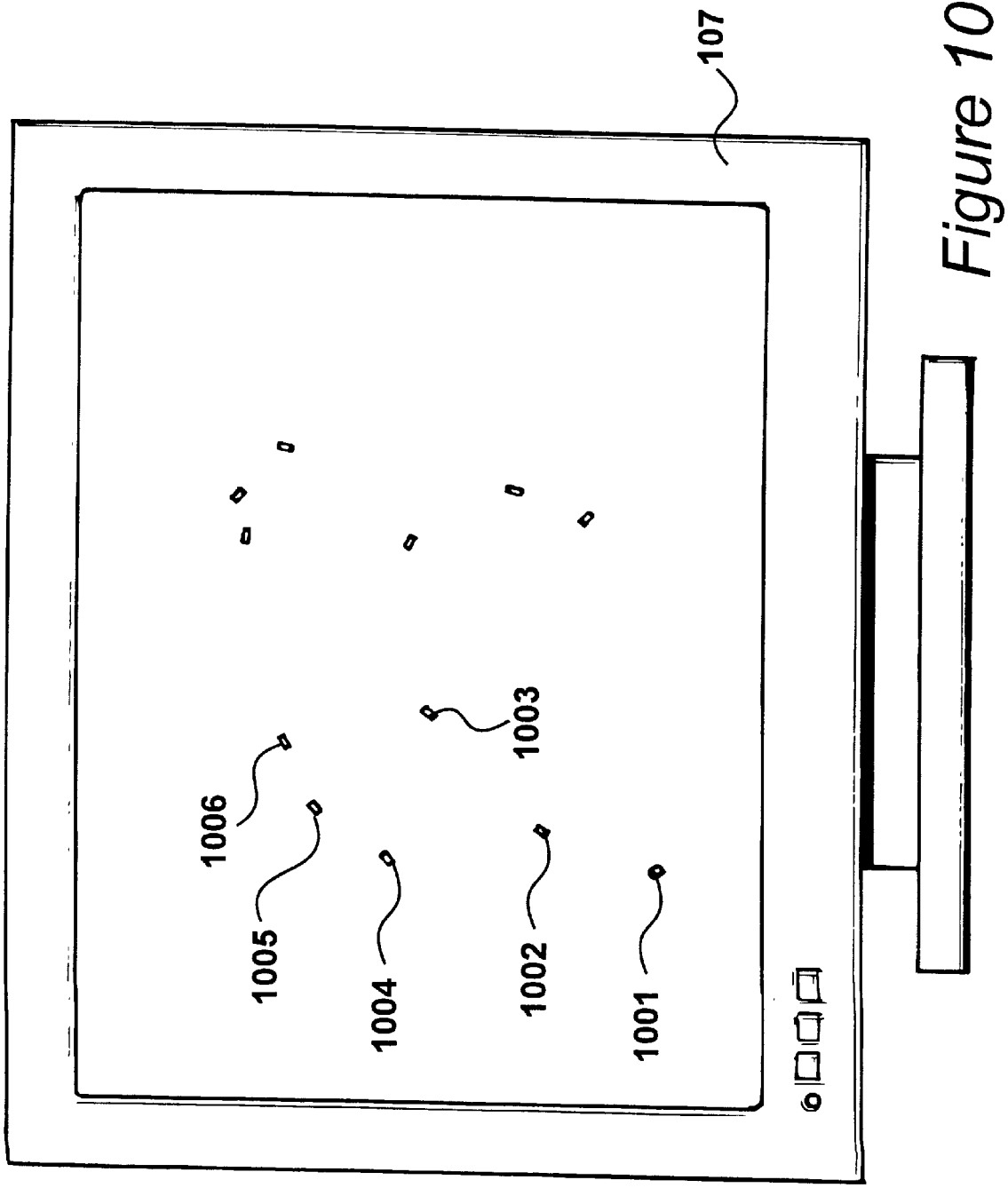
FIG. 10 shows performance data represented as a collection of markers.

Motion capture data 902 may be available as a pre-recorded file and thereby loaded in accordance with step 702. Alternatively, the performance data is captured at step 703 and thereafter the data may be displayed on display device 107 as shown in FIG. 10. When displayed on display device 107, the performance data is represented by a plurality of moving markers, each associated with a respective detector placed on the performer's body. Thus, in this example, moving markers 1001, 1002, 1003, 1004, 1005 and 1006 are derived from position detectors 201, 202, 203, 204, 205 and 206 respectively.

Figure 10A:
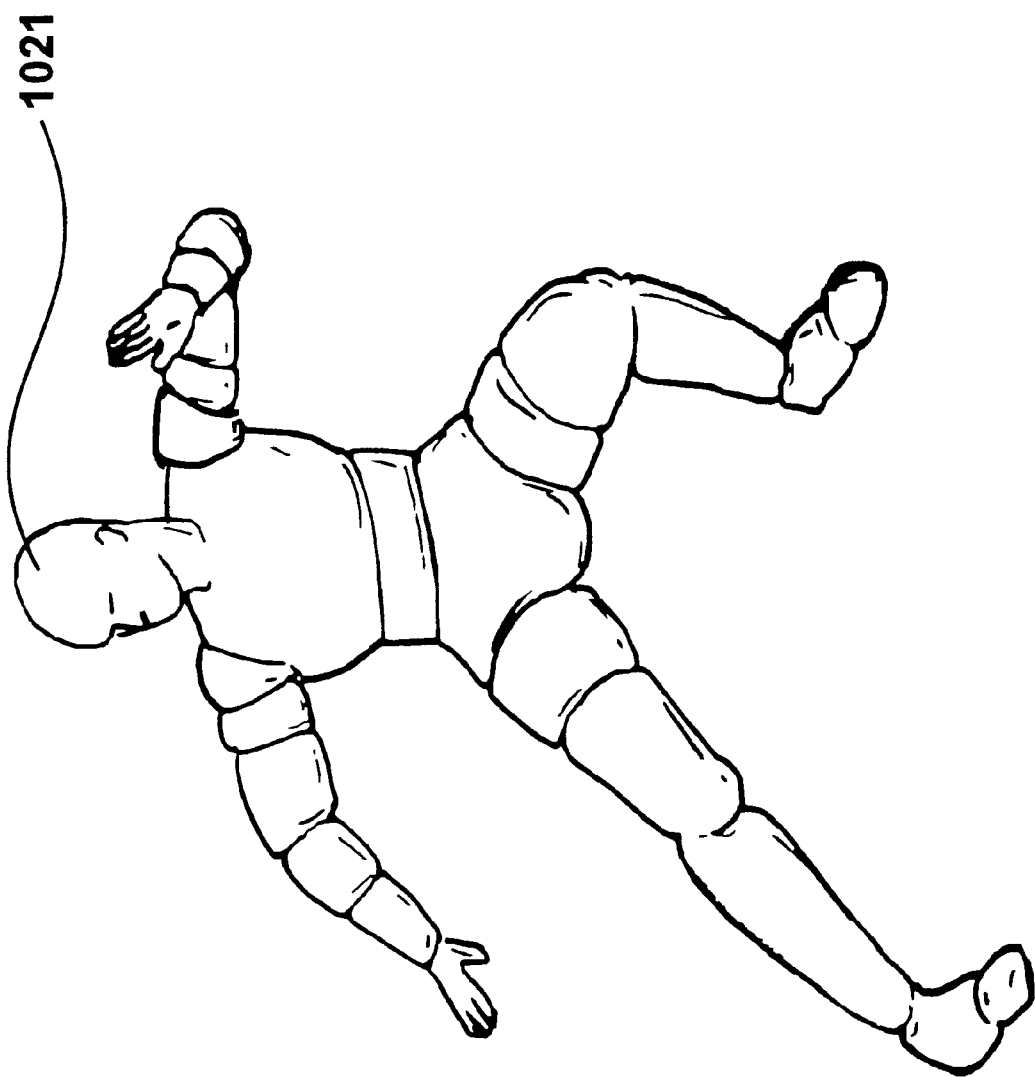
FIG. 10A illustrates a generic actor illustrated in the form of an artist's mannequin.

Performance registration data 903 may be available from a file or, alternatively, the registration data is generated at step 705, as detailed in FIG. 8. The notional generic actor effectively provides constraints for the generation of generic actor animation 905. The generic actor constraint provides an abstraction into which captured motion data may be directed to and character animation may be extracted from. The generic actor may be displayed as its skeletal elements or, to provide a more realistic view, the generic actor may be displayed in three dimensional form in a representation similar to that of an artist's mannequin as shown in FIG. 10A. The displayed generic actor model provides a mechanism for the creation of performance registration data 903 following the steps illustrated in FIG. 8.

A performer initiates a motion capture from the preferred starting position of a "T" stance. If for some reason this is not appropriate, the "T" stance position should be established at some point in the performance. This results in data being captured and represented by displayed markers as shown in FIG. 11, in which the markers reproduce these "T" stance locations. Thus, in the "T" stance shown in FIG. 11, marker 1101 represents the position of the performers hips and marker 1102 represents the position of the performer's left hand.

Figure 12:
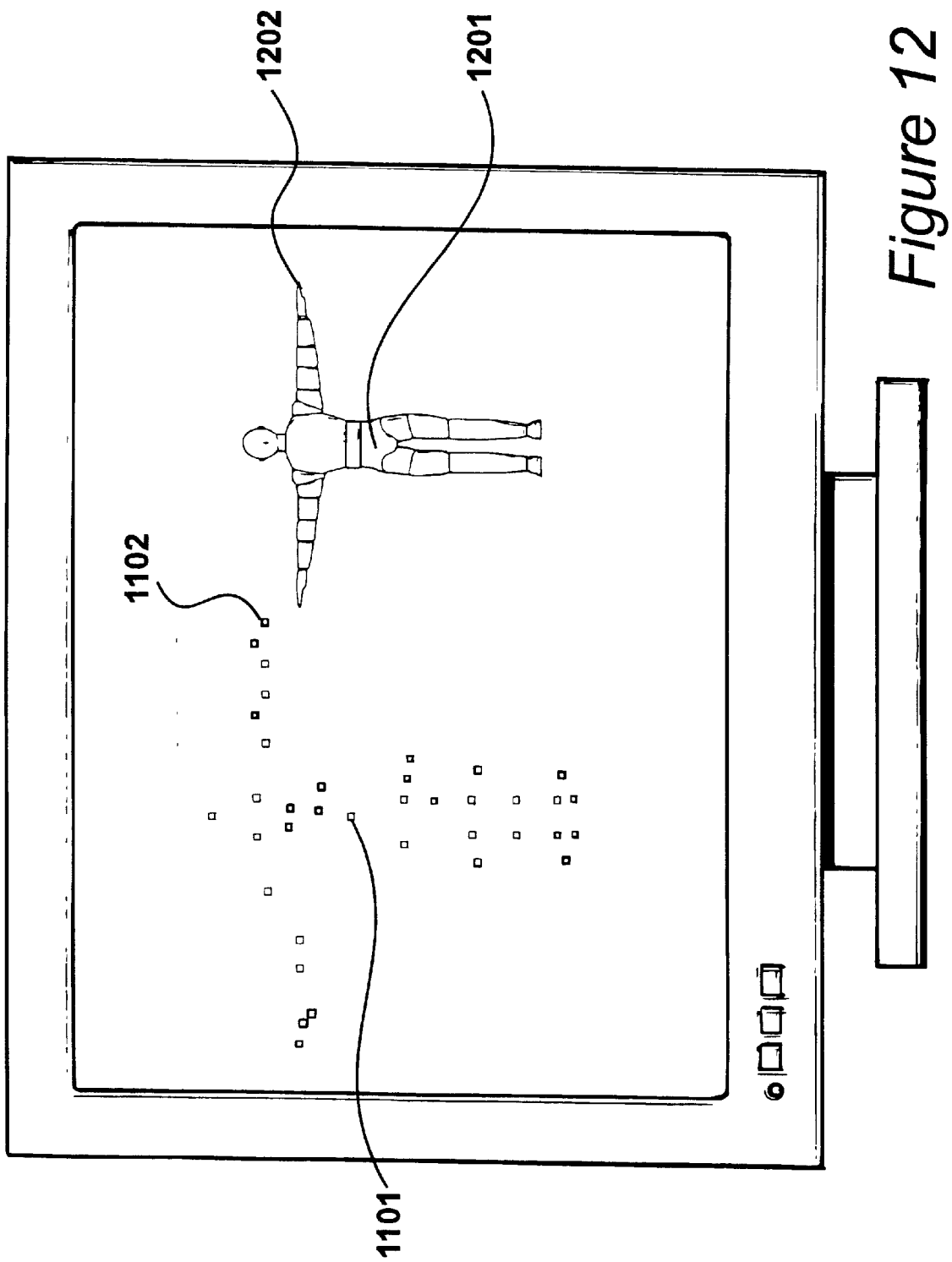
FIG. 12 illustrates the introduction of a generic actor model in order to allow registration between captured motion and the actor model.

As shown in FIG. 12, a generic actor model is now introduced into the environment in order to allow registration between the captured motion markers and positions within the actor model. Thus, as shown in FIG. 8, a body part, such as the hips 1201 of the model are selected and then marker 1101 is selected corresponding to the same body part. Similarly, marker 1102 is associated with the left hand 1202 of the generic model.

At step 804, as previously described, the relative position of the modelled body part 1201 is adjusted to fit the position of the marker location 1202. Thus, the absolute position of the marker may be different from the preferred location of the modelled body part. Under these circumstances, it is necessary to define the nature of this offset such that, in response to a detected position and orientation of a sensor, and hence a marker, it is possible to calculate the actual position of the associated location within the generic actor model.

This process is repeated for each of the body parts within the model. Thus, a left hip location is identified in the model followed by a corresponding marker location in the performance data set. This is then followed by the location of a left knee in the model and its association to a left knee marker in the performance data set. Thus, this process is repeated for the minimum associations previously identified such that body part locations of the model are associated to markers obtained from the performance data set.

The adjustments of relative positions at step 804 also involve scaling procedures in order to ensure that the performance data is registered correctly with the generic model. This may firstly include an overall sizing from a default condition, particularly if the original performer is relatively small or relatively large. In addition to this, it is possible that specific body parts or regions may require scaling if, for example, the performer has relatively large or short limbs etc. All of this data, relating the performance data to the generic model, forms the totality of the registration data set and, as can be appreciated, the operation of establishing this data set, which is an essentially manual process, is relatively time consuming and requires a degree of expertise.

Usually, there is a preferred minimum set of associated markers in order to achieve good registration between the performance data and the generic actor. However, provided that there is good registration with the hips, it is possible to obtain some degree of mapping. The provision of the bio-mechanical model 904 ensures that the movement of the generic actor is consistent with permissible body part movements. From this starting point, the more information that is provided in terms of markers, the more motion will be extracted. If registration including position and orientation has been obtained for the hips, along with two markers for the hands and two markers for the feet, it is possible to derive valid performance data registration.

Figure 13:
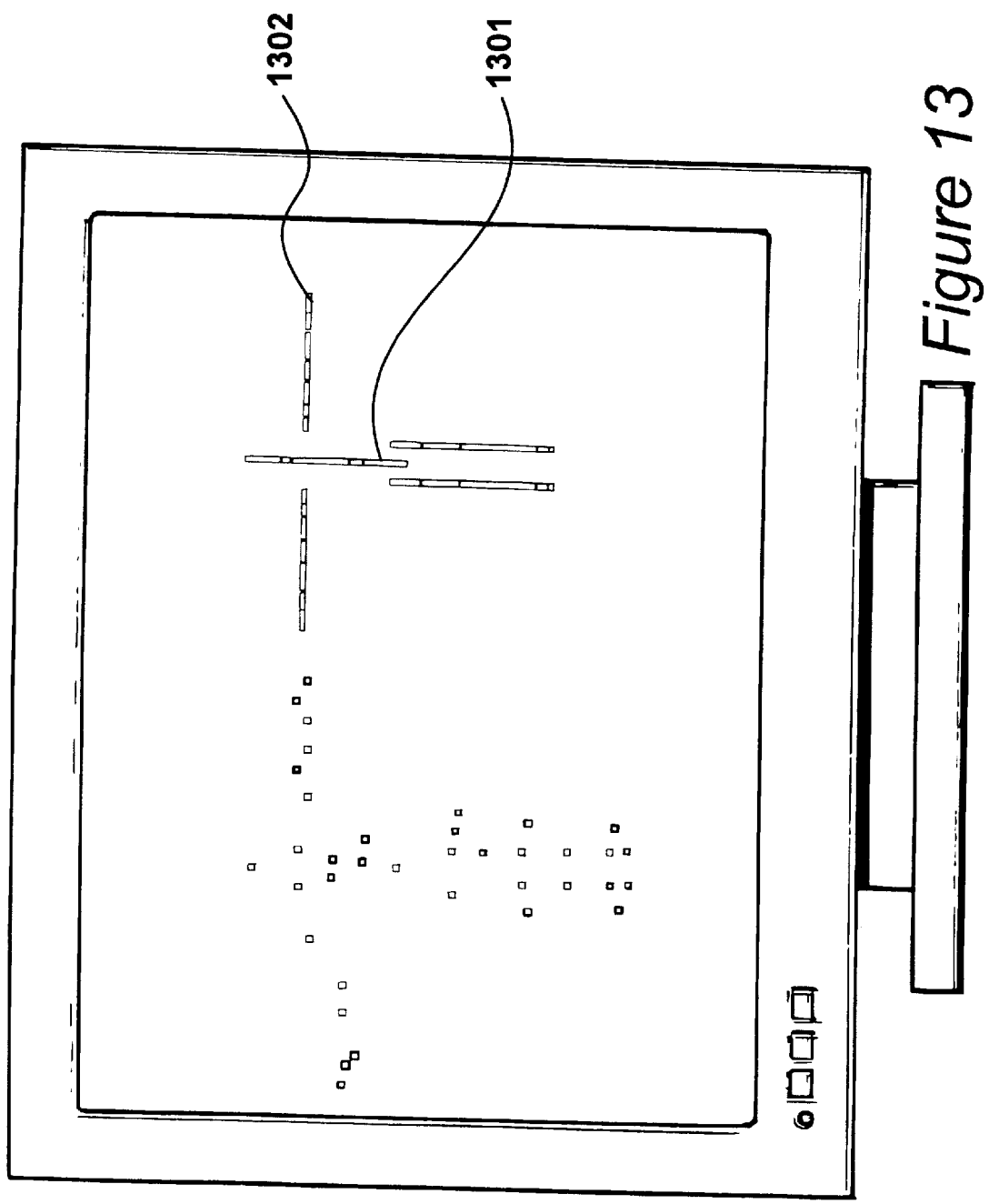
FIG. 13 shows a skeletal representation of the generic actor model.

As an alternative to representing the generic actor in solid form, the generic actor may be viewed in terms of its skeletal components, as shown in FIG. 13. This may assist in terms of registering marker locations to body part locations and during the registration process it is likely that an operator would switch between the views shown in FIG. 12 and FIG. 13. In addition, it is possible for the views of the actor, either in solid or skeletal form, to be viewed from any orientation, again to facilitate the registration process.

After performing the associations, described with respect to FIGS. 11, 12 and 13, the registration data is established, a portion of which is illustrated in FIG. 14.

Each position sensor produces three co-ordinates that define position 1401 and three co-ordinates that define an orientation offset or angle 1402. The positions of the physical sensors have been recorded within the system as marker positions, as illustrated in FIG. 11, therefore each individual marker is referenced in column 1403. The data is defined in terms of each individual marker and may be referred to as a marker set. Thus, as illustrated in FIG. 14, each marker is associated with a respective body part 1404, whereafter the position offsets and orientation offsets are defined.

Greater accuracy is obtained by having more markers and it is possible for an individual body part to be defined by more than one marker. However, if insufficient information is available for the generic actor animation to be fully defined with reference to the real performance registration data, assistance is provided by the mechanism of the bio-mechanical model, which effectively restrains the number of possible solutions and insures that the resulting generic actor animation is consistent with body movements that are allowed in terms of the bio-mechanical model definitions.

A data file of the type illustrated in FIG. 14 represents the registration data of the type that is stored at step 806 of FIG. 8.

Figure 15:
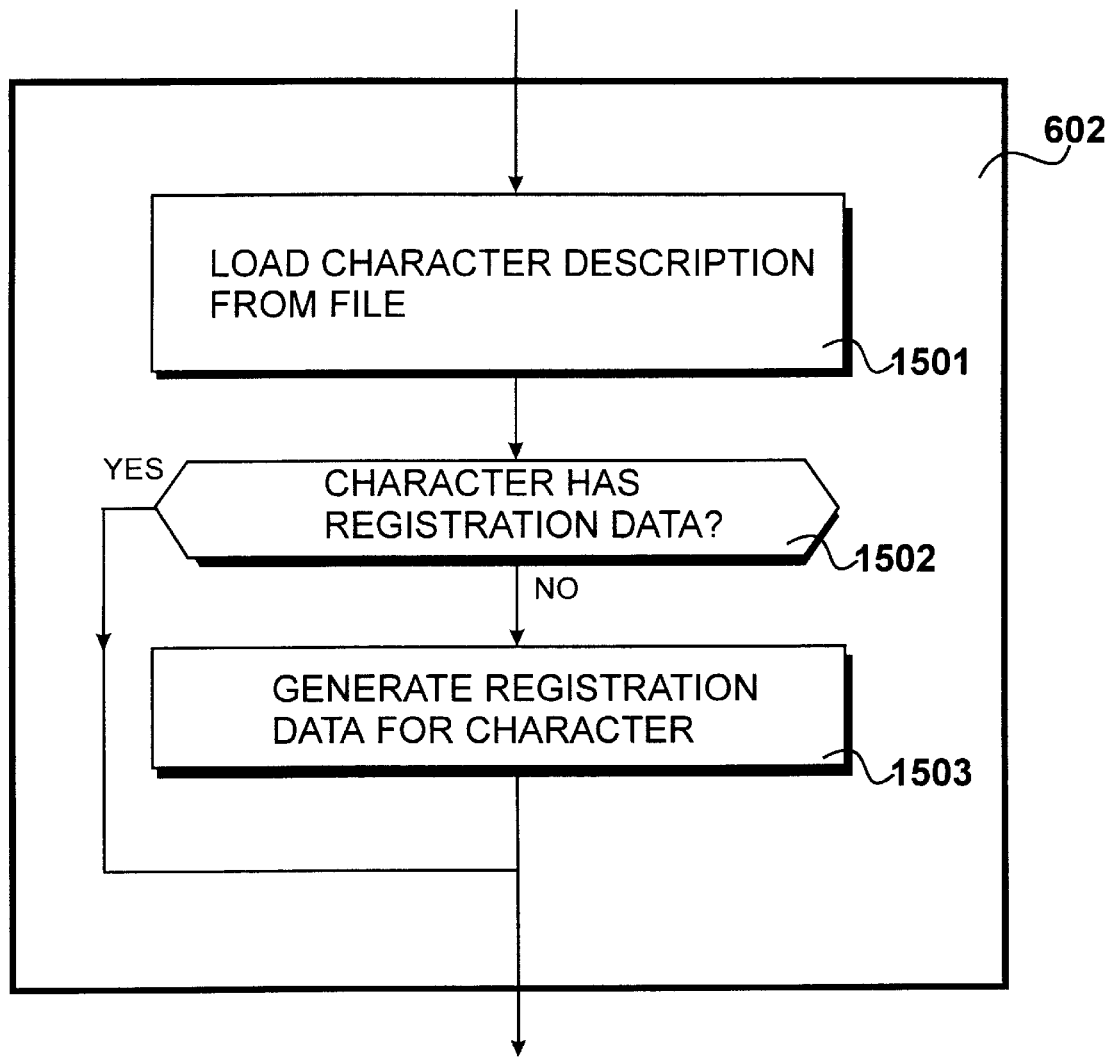
FIG. 15 illustrates the process identified in FIG. 6 for the loading of character data.

Process 602 for the loading of character data is illustrated in FIG. 15. At step 1501 a character description is loaded from a file and at step 1502 a question is asked as to whether the character has registration data. If registration data is available, it is now possible for the generic actor animation data to be supplied to solver 906 in order to produce the character animation. However, if registration data is not available, resulting in the question asked at step 1502 being answered in the negative, the registration data is generated at step 1503.

Figure 16:
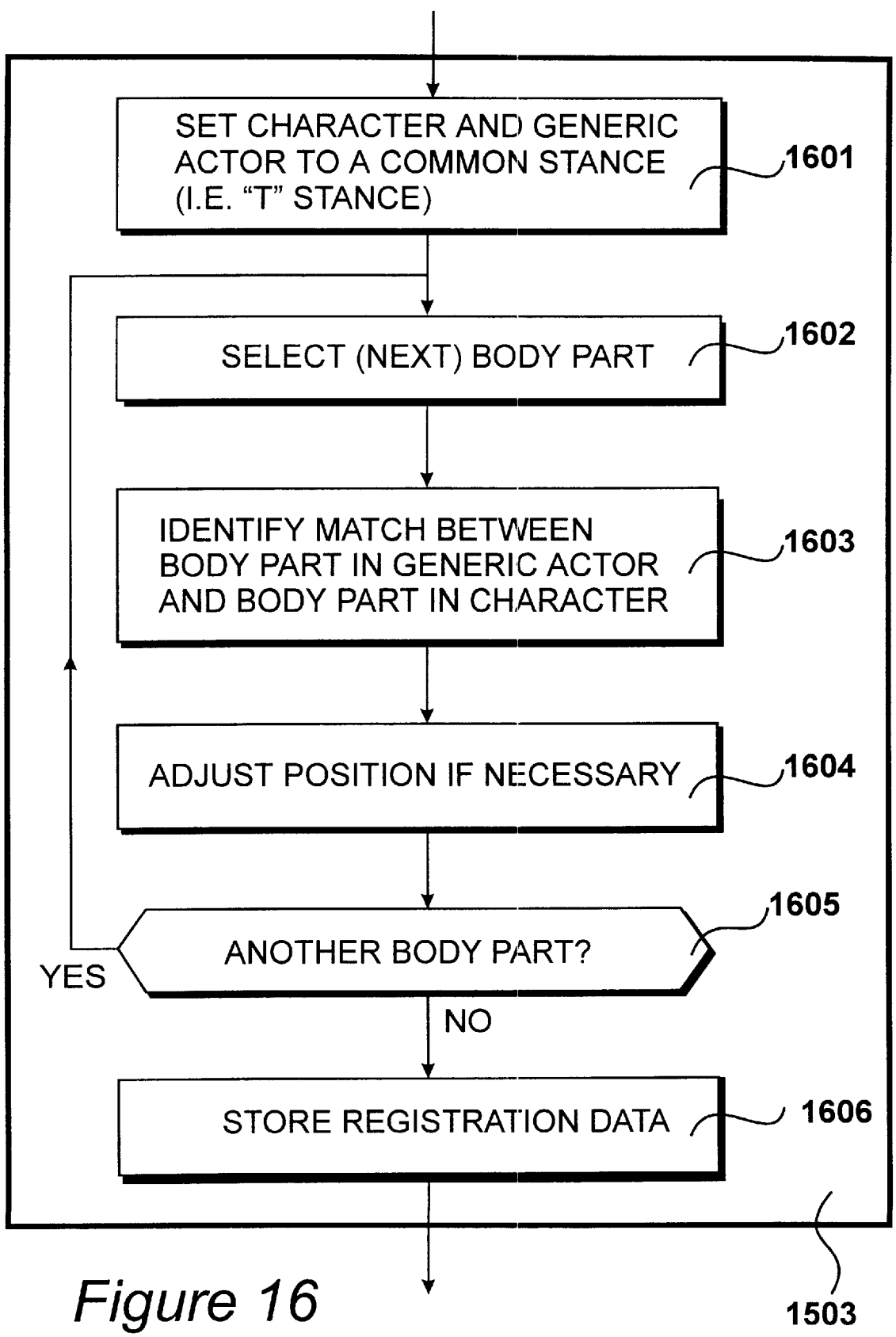
FIG. 16 details the process identified in FIG. 15 for the generation of registration data.

Process 1503 for the generation of registration data is detailed in FIG. 16. At step 1601 the character to be animated and the generic actor animation data are set to the initial starting position of the "T" stance. At step 1602 a body part of the character is selected and at step 1603 a match is identified between the body part in the generic actor model and a body part of the character to be animated.

At step 1604 the associated position is adjusted if considered necessary whereafter at step 1605 a question is asked as to whether a further body part is to be processed. When answered in the affirmative, a further body part is selected at 1602 until all body parts have been registered resulting in the question asked at step 1605 being answered in the negative. Thereafter, at step 1606 the registration data is stored and associated with the particular character, such that the data is available if the character data is loaded again.

FIG. 17 illustrates how data defining body parts for the generic actor are associated with similar body parts of the character. The character description 907 includes a list of the component parts of the character. In the present example, a character representing a samurai warrior is to be animated. Conventionally, in known approaches, the definition of the samurai warrior would be associated with the original performance data. However, following the present invention, it is only necessary for the samurai character to be associated once to the generic actor thereby providing a link, through the generic animation space, between specific performances and specific character descriptions.

As illustrated in FIG. 17, the generic actor is defined in terms of a list of body parts 1701. An operator opens a file relating to the character description and thereafter manually creates an association between the body parts of the generic actor with similar body parts of the character. Thus, after completing this process, there is a respective list of character body parts 1702 which, for example, associates the hips of the generic actor with samuraihips and the left upper leg of the actor with samuraileftupleg. Thus, this process is repeated so as to associate individual body parts of the generic actor with individual body parts of the character, whereafter as necessary, position offsets and orientation offsets are defined so as to create a file for the character registration similar to the performance registration as illustrated in FIG. 14.

Figure 18:
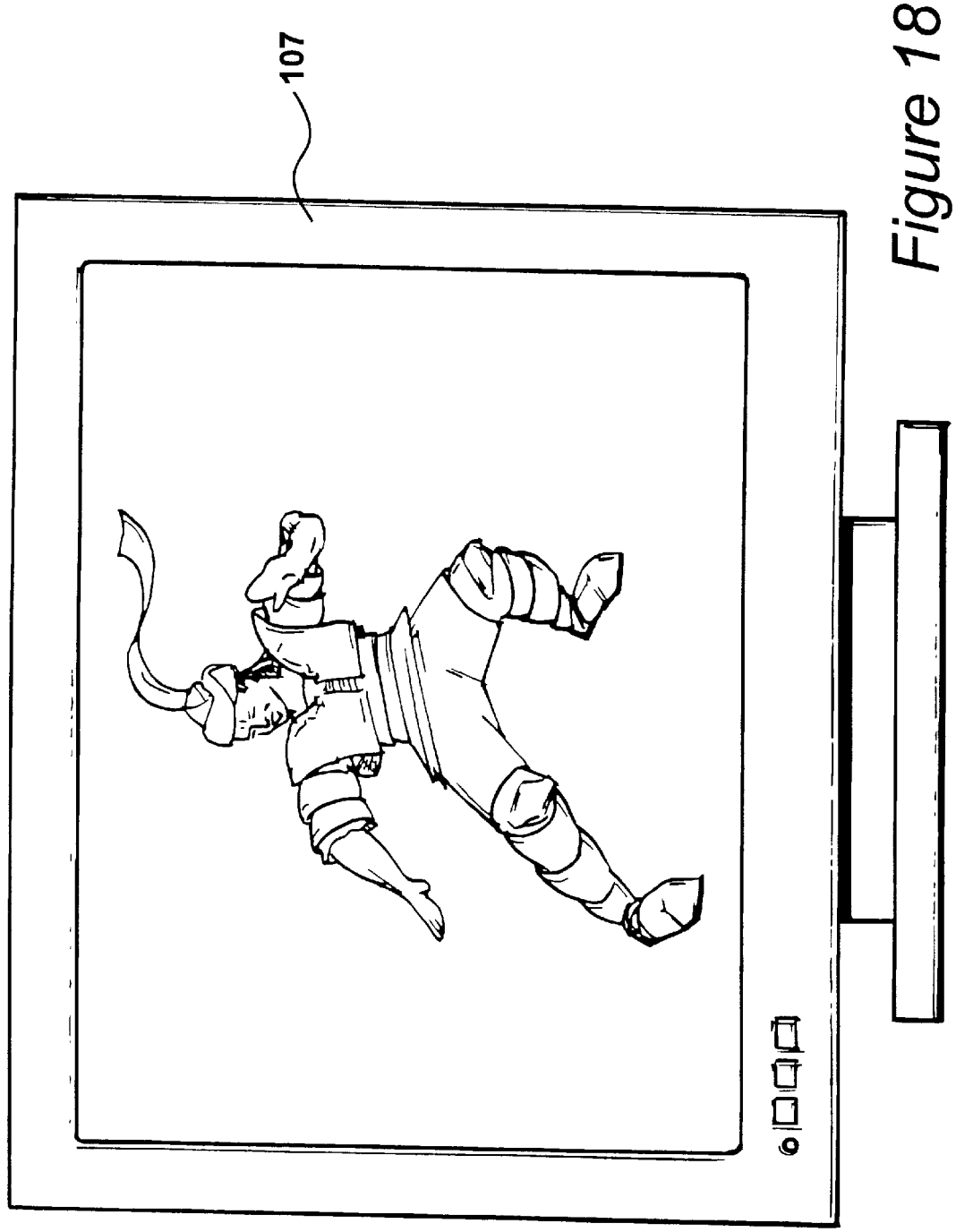
FIG. 18 shows an example of a resulting animated character.

An illustration of the resulting animated character is shown in FIG. 18, as displayed on monitor 107. The character shown in FIG. 18 performs an animation that has been derived from the performance illustrated in FIG. 2. However, the animated character of FIG. 18 has not been directly registered with the marker set associated with the performance shown in FIG. 2. In this way, useful results may be obtained by substituting either the marker set for a different marker set, resulting in the character performing a different animation, or, alternatively, the character definition could be changed resulting in a different character performing the same animation. Modifications of this type are easily affected, thereby significantly enhancing artistic capabilities, provided that the characters of interest have been registered to the generic actor animation and animations of interest, in terms of performances, have also been registered to the generic actor animation. The generic actor animation therefore provides a space in which an abstraction of the animation may be defined that is itself then linked to a real animation captured from a real performer and is in turn linked to a character description displayable as an animation.

Figure 19:
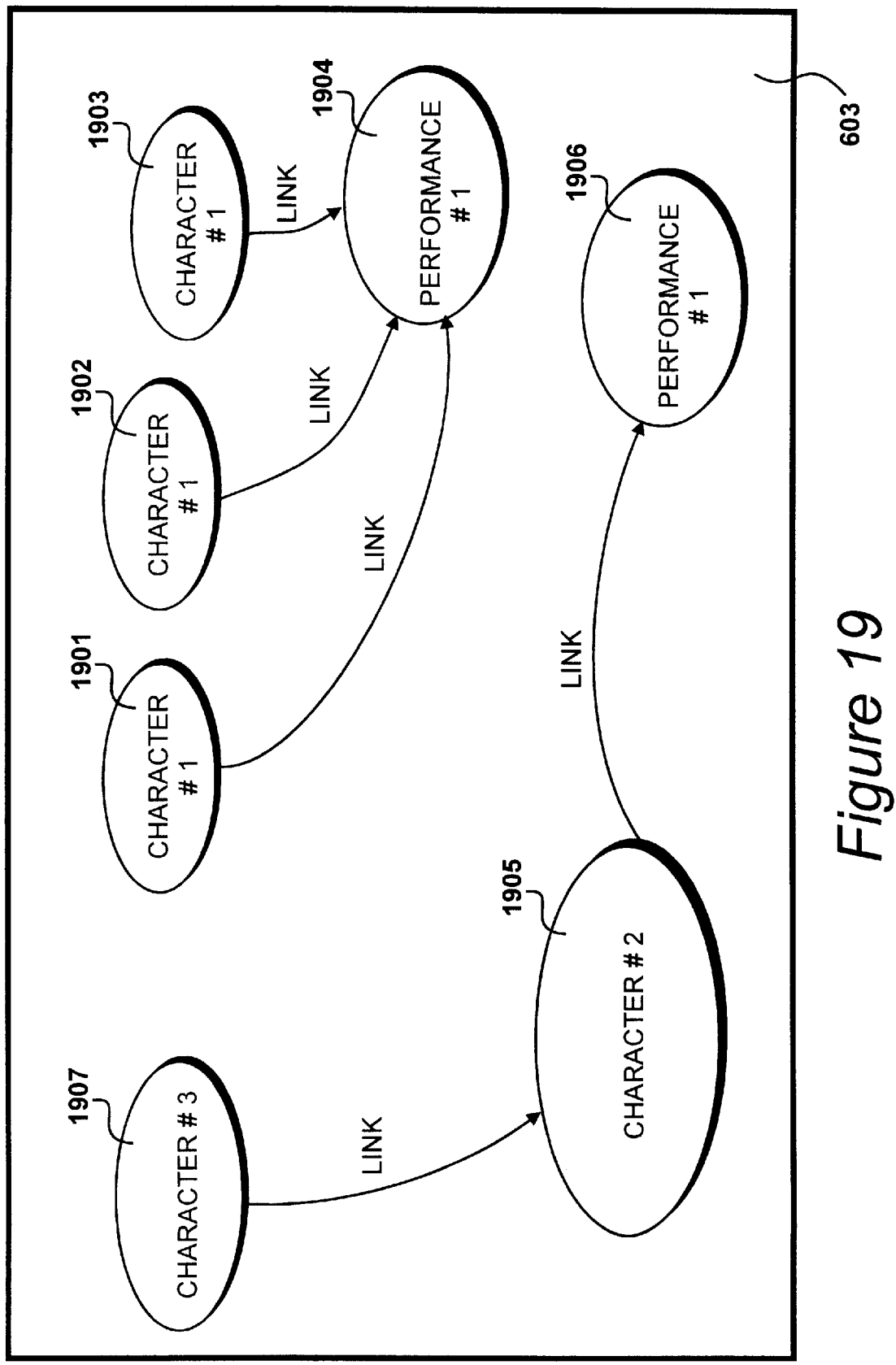
FIG. 19 gives an example of linking between objects.

Having established relationships between performance data and a generic actor animation and, in addition to this, having established relationships between character descriptions and a generic actor, character animations 910 are produced by bringing these elements together by effectively linking the objects. Process 603, identified in FIG. 6, defines a user interface that facilitates the linking of objects to specify dependencies. Thus, in response to user manipulation, links between objects are defined and an example of such links is illustrated in FIG. 19. In this particular animation, object data for the character shown in FIG. 18 is to be created three times to create three representations of this character each carrying out the same performance. Thus, in FIG. 19, the character shown in FIG. 18 is identified as character number 1 and the actual animation that it performs is defined by performance number 1. Thus the character is created three times, represented by objects 1901, 1902 and 1903. The performance object is created as 1904 and then each of characters 1901, 1902 and 1903 are linked to performance object 1904.

The linking of a character to a performance also facilitates the establishment of other control parameters to ensure that the motion of the character is consistent within the environment of the overall animation. Thus, it may be necessary to perform a degree of scaling to ensure that the illusion of the animation is maintained and when a link is made between a specific character 1901 and performance 1904 these parameters may be controlled for this particular link. Thus, the parameters may be adjusted differently for the link between character 1902 and performance 1904.

On some occasions, adjustments of this type may not be necessary and a second character can take advantage of adjustments made for a first character. Thus, as shown in FIG. 19, a second character has been created identified by object 1905. Character 1905 is linked to a second performance identified as object 1906 and adjustments have been made to ensure that the animated character operates correctly within its environment. Thus, a typical example of this is to ensure that the character's feet appear to be in contact with the floor without introducing any further distortions to the nature of the character. This may be a relatively time consuming process but it is possible that, having completed this process, the parameters may be used again for another character. This situation has arisen to the effect that character number 3, created as object 1907 does not require the establishment of its own specific environment data and may make use of the environment data established for character number 2. Consequently, character object 1907 is linked to object 1905 as an alternative to being linked to object 1906. Thus, under normal circumstances, a character requires a link to performance data in order to perform the animation. However, if a first character has been linked to a second character, such as the link between objects 1905 and 1906, it is possible for a second character, such as that illustrated by object 1907, to be linked to a character. Thus, as far as object 1907 is concerned it is receiving performance data but this performance data takes the form of character data 1905.

It is also possible for the system to effectively recycle a character animation to a new character animation. In order to achieve this, the existing character animation is associated with the generic actor model as an alternative to associating performance data. Having made this association, it is then possible for the new character driven performance to be associated, via the generic actor, to a new character. Thus, in this way, existing character animations, or existing skeleton animations, possible derived from large existing motion banks, may be used to drive new characters without being required to produce new performance data from a physical performer.

Figure 20:
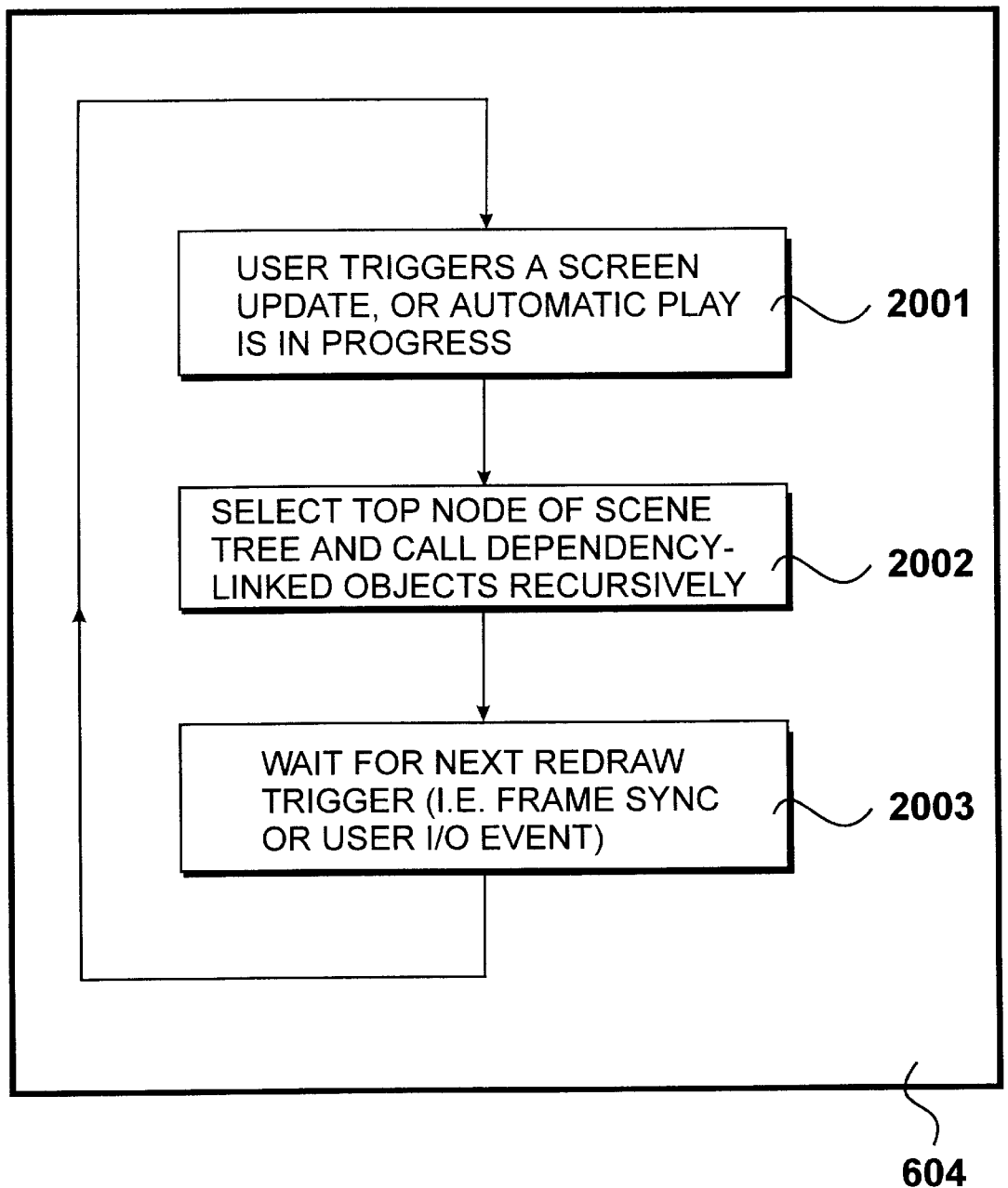
FIG. 20 details the process identified in FIG. 6 for animating characters.

Process 604 for animating the characters identified in FIG. 6 is detailed in FIG. 20. For step 2001 the user triggers a screen update or automatic play is maintained. At step 2002 the top node of a scene tree is selected and dependency linked objects are called recursively.

At step 2003, the procedure waits for the next redraw trigger, such as a frame synchronisation signal, or waits for an appropriate user input/output event. Thereafter, control is returned to step 2001 until all of the animation data has been processed.

Figure 21:
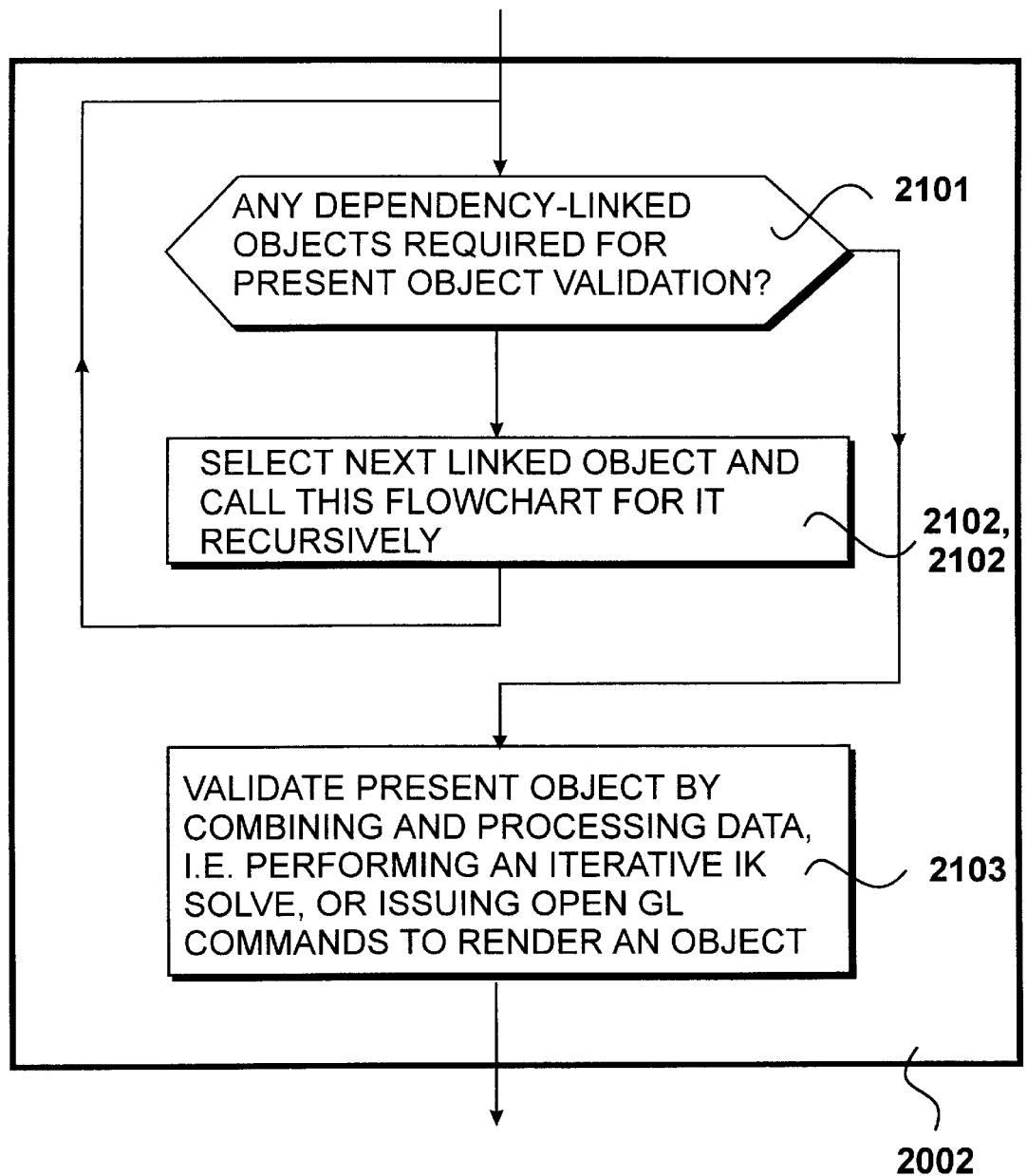
FIG. 21 details the process identified in FIG. 20 involving a recursive call of dependency linked objects.

Process 2002 is detailed in FIG. 21. At step 2101 a question is asked as to whether any dependency-linked objects are required for the present object validation. When answered in the affirmative, control is directed to step 2102, which is effectively process 2002 placed in recursive loop. Thus, the next linked object is selected recursively as previously described. Eventually, no further objects will be required and the question asked at step 2101 will be answered in the negative, thereby directing control to step 2103.

At step 2103 the present object is validated by combining and processing data and performing an iterative inverse kinematic solution or by issuing open GL commands to render the object, dependent upon the type of object that is being processed.

An example output frame of an animation produced by the linking definition shown in FIG. 19 is illustrated in FIG. 22. Objects 1901, 1902 and 1903 result in the presentation of animated characters 2201, 2202 and 2203, each derived from the same character definitions and the same performance data. Character object 1907 results in the display of animated character 2207 which, as previously described, is linked to character object 1905, displayed as animated character 2205.

The invention introduces a new concept that has been identified as animation space. It allows an abstraction of a particular animation to be defined in this animation space, in a form that is independent of the original performance data captured from a real performance and is independent of specific animation characters. Given a set of a performances that need to be combined in all combinations with b characters, the total number of registration exercises required to achieve this would be the product of a multiplied by b. When invoking the present invention, a similar exercise would require each of the performances to be registered to the generic actor and for each of the characters to be registered to the generic actor. Thereafter, any performance could be applied to any character but the number of registration exercises that have taken place is only the sum of a and b. Consequently, in many applications a considerable saving may be made and greater use may be made of existing libraries for performances and character definitions.

What is claimed is:

1. In a computer animation system, apparatus for generating action data for animating a character such that body part locations for a selected character are positioned in response to body part locations captured from performance data, comprising processing means and storage means; wherein said storage means is configured to store program instructions for said processing means, performance data, registration data for a performance and registration data for a character;

said processing means is configurable by said program instructions to perform the steps of:

(a) identifying the location of body parts of a generic actor in response to a performance in combination with a bio-mechanical model; and (b) identifying the location of body parts of a character in response to the position and orientation of body parts of said generic actor in combination with a bio-mechanical model; such that said registration data for said performance associate body parts in said performance data and body parts in said generic actor; and said registration data for said character associates body parts in said generic actor with body parts in said character.

2. Apparatus according to claim 1, wherein said step of identifying the location of body parts of a generic actor in response to a performance in combination with a bio-mechanical model includes a process of inverse kinematic solving and said process of identifying the location of body parts of a character in response to the position and orientation of body parts of said generic actor also includes a process of inverse kinematic solving.

3. Apparatus according to claim 1, wherein the bio-mechanical model used at process B for identifying the location of body parts of a character is the same bio-mechanical model that is used during process A for the location of body parts of a generic actor.

4. Apparatus according to claim 1, wherein said storage means includes additional instructions, such that a user of said system may select new performance data without changing an association between said generic actor and said character.

5. Apparatus according to claim 1, wherein said storage means includes additional instructions such that a user of said system selects a new character without changing an association between said performance data and is said generic actor.

6. Apparatus according to claim 1, wherein said storage means includes additional instructions to perform the additional step of rendering said character.

7. Apparatus according to claim 1, wherein said registration data associates parts in body structures having a different relative sizes.

8. Apparatus according to claim 1, wherein said performance data is derived from existing character data.

9. Apparatus according to claim 1, wherein said registration data associates parts in body structures that include human characteristics.

10. Apparatus according to claim 1, including instructions for representing the generic actor in a form that may be displayed.

11. A method of generating action data for animating a character, such that body part positions for a selected character are positioned in response to body part positions captured from performance data, comprising the steps of:

identifying the position and orientation of body parts of a generic actor in response to a performance in combination with a bio-mechanical model; and identifying the position and orientation of body parts of a character in response to the position and orientation of body parts of said generic actor in combination with a bio-mechanical model, such that said registration data for said performance associates body parts in said performance data and body parts in said generic actor; and said registration data for said character associates body parts in said generic actor with body parts in said character.

12. A method according to claim 11, wherein said step of identifying the position and orientation of body parts of a generic actor in response to a performance including inverse kinematic solving and said step of identifying the position and orientation of body parts of a character and also involves a process of inverse kinematic solving.

13. A method according to claim 11, wherein said step of identifying the position and orientation of body parts of a generic actor and said step of identifying the position and orientation of body parts of the character use the same bio-mechanical model.

14. A method according to claim 11, wherein new performance data is used without changing an association between said generic actor and said character.

15. A method according to claim 11, wherein a new character may be selected without changing an association between a selected performance data set and a selected generic actor.

16. A method according to claim 11, wherein an animated character is rendered.

17. A method according to claim 11, wherein said registration data asserts parts in body structures having different relative sizes.

18. A method according to claim 11, wherein said performance data is derived from existing character data.

19. A method according to claim 11, wherein said registration data asserts parts in body structures that include human characteristics.

20. A method according to claim 11, wherein said generic actor is displayable as a skeleton or as a solid figure.

21. A computer readable medium having computer readable instructions executable by a computer such that, when executing said instructions, the computer will perform:

identifying the position and orientation of body parts of a generic actor in response to a performance in combination with a bio-mechanical model; and identifying the position and orientation of body parts of a character in response to the position and orientation of body parts of said generic actor in combination with a bio-mechanical model, such that said registration data for said performance associates body parts in said performance data and body parts in said generic actor; and said registration data for said character associates body parts in said generic actor with body parts in said character.

* * * * *